US007825208B2

(12) United States Patent
Ricci

(10) Patent No.: US 7,825,208 B2
(45) Date of Patent: *Nov. 2, 2010

(54) GOLF EQUIPMENT FORMED FROM AMINE-ADDUCT MODIFIED POLYUREA COMPOSITIONS

(75) Inventor: Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 1179 days.

This patent is subject to a terminal disclaimer.

(21) Appl. No.: 11/373,264

(22) Filed: Mar. 13, 2006

(65) Prior Publication Data

US 2006/0178233 A1 Aug. 10, 2006

(51) Int. Cl.
*A63B 37/12* (2006.01)
*A63B 37/00* (2006.01)
*C08G 18/58* (2006.01)
*C08G 18/61* (2006.01)

(52) U.S. Cl. .......................... 528/28; 528/27; 525/452; 525/454; 525/474; 525/476; 473/371; 473/374; 473/378

(58) Field of Classification Search .................. None
See application file for complete search history.

(56) References Cited

U.S. PATENT DOCUMENTS

| | | | |
|---|---|---|---|
| 4,625,361 A | 12/1986 | Fischbach | 525/92 |
| 4,675,361 A | 6/1987 | Ward, Jr. | 525/92 |
| 5,006,297 A | 4/1991 | Brown et al. | 264/234 |
| 5,218,005 A | 6/1993 | Zimmerman et al. | 521/58 |
| 5,221,724 A | 6/1993 | Li et al. | 528/28 |
| 5,334,673 A | 8/1994 | Wu | 273/235 R |
| 5,428,123 A | 6/1995 | Ward et al. | 128/28 |
| 5,461,134 A | 10/1995 | Leir et al. | 528/14 |
| 5,484,870 A | 1/1996 | Wu | 528/28 |
| 5,530,083 A | 6/1996 | Phelps et al. | 528/25 |
| 5,589,563 A | 12/1996 | Ward et al. | 528/44 |
| 5,688,191 A | 11/1997 | Cavallaro et al. | 473/373 |
| 5,692,974 A | 12/1997 | Wu et al. | 473/377 |
| 5,713,801 A | 2/1998 | Aoyama | 473/354 |
| 5,725,443 A | 3/1998 | Sugimoto et al. | 473/378 |
| 5,733,428 A | 3/1998 | Calabria et al. | 264/134 |
| 5,803,831 A | 9/1998 | Sullivan et al. | 473/374 |
| 5,817,735 A | 10/1998 | Hatch et al. | 528/84 |
| 5,820,491 A | 10/1998 | Hatch et al. | 473/378 |
| 5,863,627 A | 1/1999 | Szycher et al. | 428/36.8 |
| 5,885,172 A | 3/1999 | Hebert et al. | 473/354 |
| 5,908,358 A | 6/1999 | Wu | 473/378 |
| 5,919,100 A | 7/1999 | Boehm et al. | 473/354 |
| 5,965,669 A | 10/1999 | Cavallaro et al. | 525/221 |
| 5,976,035 A | 11/1999 | Umezawa et al. | 473/364 |
| 5,977,284 A | 11/1999 | Reich et al. | 528/53 |
| 5,981,654 A | 11/1999 | Rajagopalan | 525/66 |
| 5,981,658 A | 11/1999 | Rajagopalan et al. | 525/72 |
| 6,056,842 A | 5/2000 | Dalton et al. | 156/243 |
| 6,149,535 A | 11/2000 | Bissonnette et al. | 473/354 |
| 6,159,110 A | 12/2000 | Sullivan et al. | 473/374 |
| 6,162,134 A | 12/2000 | Sullivan et al. | 473/373 |
| 6,180,040 B1 | 1/2001 | Ladd et al. | 264/248 |
| 6,180,722 B1 | 1/2001 | Dalton et al. | 525/193 |
| 6,204,331 B1 | 3/2001 | Sullivan et al. | 525/221 |
| 6,207,784 B1 | 3/2001 | Rajagopalan | 528/71 |
| 6,386,992 B1 | 5/2002 | Harris et al. | 473/371 |
| 6,398,669 B1 | 6/2002 | Yokota et al. | 473/378 |
| 6,437,078 B1 | 8/2002 | Smith | 528/78 |
| 6,476,130 B1 | 11/2002 | Rajagopalan et al. | 525/74 |
| 6,503,156 B1 | 1/2003 | Sullivan | 473/374 |
| 6,506,130 B2 | 1/2003 | Sullivan | 473/374 |
| 6,706,821 B1 | 3/2004 | Letchford | 525/302 |
| 2001/0009310 A1 | 7/2001 | Hebert et al. | |
| 2001/0018375 A1 | 8/2001 | Hayashi et al. | |
| 2001/0019971 A1 | 9/2001 | Hayashi et al. | |
| 2002/0025862 A1 | 2/2002 | Sullivan et al. | |
| 2002/0028885 A1 | 3/2002 | Sullivan et al. | |
| 2003/0078348 A1 | 4/2003 | Rajagopalan et al. | |
| 2003/0106442 A1 | 6/2003 | Gosetti | |
| 2003/0114605 A1 | 6/2003 | Harris et al. | |
| 2003/0114624 A1 | 6/2003 | Harris et al. | |
| 2003/0119989 A1 | 6/2003 | Ladd et al. | |
| 2003/0220464 A1 | 11/2003 | Wu et al. | |
| 2004/0010096 A1* | 1/2004 | Rajagopalan et al. | 525/453 |
| 2004/0063803 A1 | 4/2004 | Kim et al. | |
| 2004/0198940 A1* | 10/2004 | Wu et al. | 528/28 |
| 2004/0210010 A1* | 10/2004 | Smith | 525/476 |
| 2004/0266971 A1 | 12/2004 | Wu | |
| 2006/0173139 A1* | 8/2006 | Ricci et al. | 525/452 |
| 2006/0178233 A1 | 8/2006 | Ricci | |
| 2007/0270240 A1* | 11/2007 | Smith | 473/368 |

OTHER PUBLICATIONS

U.S. Appl. No. 11/135,288, filed May 24, 2005 entitled "Multi-Modal Ionomeric Golf Ball Compositions".

(Continued)

*Primary Examiner*—David Buttner
(74) *Attorney, Agent, or Firm*—Hanify & King, P.C.

(57) ABSTRACT

Golf equipment having at least one portion formed from amine-adduct modified polyurea compositions, including epoxy-silicone modified polyurea compositions, epoxy modified polyurea compositions, silicone modified polyurea compositions, and polyurea compositions including polyamine/carbonyl adducts and/or amine-modified adducts having backbones based on polyfunctional acrylates or methacrylates or caprolactone monomers or oligomers.

18 Claims, 1 Drawing Sheet

OTHER PUBLICATIONS

U.S. Appl. No. 11/130,243, filed May 17, 2005 entitled "Golf Balls Incorporating Rigid, Rosin-Modified Polymers".

U.S. Appl. No. 10/900,469, filed Jul. 28, 2004 entitled "Golf Ball Layers Formed of Polyurethane-Based and Polyurea-Based Compositions Incorporating Block Copolymers".

Non-Final Office Action dated Aug. 17, 2009 of corresponding U.S. Appl. No. 11/599,270.

Non-Final Office Action dated Jun. 15, 2009 of corresponding U.S. Appl. No. 11/373,441.

Notice of Allowance dated Dec. 14, 2009 of corresponding U.S. Appl. No. 11/373,441.

* cited by examiner

GOLF EQUIPMENT FORMED FROM AMINE-ADDUCT MODIFIED POLYUREA COMPOSITIONS

FIELD OF THE INVENTION

The invention relates to golf equipment having at least a portion formed from amine-adduct modified polyurea compositions, including epoxy-silicone modified polyurea compositions, epoxy modified polyurea compositions, silicone modified polyurea compositions, and polyurea compositions including polyamine/carbonyl adducts and/or amine-modified adducts having backbones based on polyfunctional acrylates or methacrylates or caprolactone monomers or oligomers. In particular, the present invention is directed to a composition formed from an amine adduct including an epoxy/silicone backbone, an epoxy backbone, a silicone backbone, and/or an amine-terminated moiety with polyfunctional acrylates or methacrylates.

The amine adduct is reacted with an isocyanate in a particular stoichiometric ratio. Depending on the stoichiometric ratio, the reaction of the amine adduct and isocyanate forms a prepolymer, which is further cured with a curing agent, or a fully cured polyurea. The polyurea compositions of the invention have a controlled reaction rate, a decreased shrinkage rate, increased homogenous properties, increased adherence, and increased chemical resistance.

The invention also relates to golf balls including thermoplastic silicone-urethane copolymer materials for improving golf ball physical properties.

BACKGROUND OF THE INVENTION

Golf ball manufacturers are constantly trying to achieve the perfect balance between feel and performance. The physical characteristics of a golf ball are determined by the combined properties of the core, any intermediate layers, and the cover. These, in turn, are determined by the chemical compositions of each layer. The composition of some balls will provide for increased distance. Other compositions provide for improved spin.

For example, golf ball covers formed from balata allow players to achieve spin rates sufficient to control ball direction and distance, particularly on shorter shots, but balata covers are easily damaged. In contrast, golf balls covers formed from ionomer resins provide higher durability and overall distance, but the spin and feel are inferior compared to balata covered balls. And, unlike ionomer-covered golf balls, polyurethane covered golf balls can be formulated to possess the soft "feel" of balata covered golf balls, however, golf ball covers made from polyurethane have not, to date, fully matched ionomer-covered golf balls with respect to resilience or the rebound of the golf ball cover. In addition, polyurethane-covered golf balls are generally susceptible to yellowing (due to the aromatic nature of the material) and moisture absorption. While paints and moisture barrier layers may be used to counteract against the yellowing and moisture absorption in polyurethane-covered balls, the resilience and rebound are more difficult to design around.

Polyurea materials have recently come onto the scene for golf ball layer materials due to the improved resilience and adherence to layers formed of different materials. In addition, because polyurea-based compositions may be formed from aliphatic materials, the yellowing of aromatic polyurethane-covered golf balls is typically not an issue for aliphatic polyurea-covered golf balls. Similar to polyurethane, however, because a polyurea golf ball cover is generally softer than a thermoplastic ionomer golf ball cover, the shear (cut) resistance does not compare to an ionomer-covered golf ball.

Conventional polyurea compositions have several characteristics that are undesirable for golf equipment applications including uncontrollable reaction rates, non-homogenous mixtures, poor adhesion, shrinkage, and non-optimal chemical resistance. For example, the reaction times for conventional polyurea compositions are very fast, i.e., an aliphatic isocyanate and an aliphatic amine may react and gel in about 5 seconds, which make it difficult to control the formation of the composition. In addition, several reactions may take place in a polyurea composition, which result in a non-homogenous mixture. For instance, a first reaction may take place between the highly reactive components followed by subsequent reactions between the less reactive components. The non-homogenous nature may affect the finish, properties, and consistency of the resultant composition.

The adhesion properties of a conventional polyurea composition are also less than desirable. In fact, fast reactions between the amine and isocyanate do not allow adequate time for the polyurea to penetrate and adhere to a substrate. Furthermore, conventional polyurea compositions have a shrinkage rate of higher than 1 percent when cured. As such, when a golf ball layer is formed from a conventional polyurea composition, the desired dimensions may not be realized. Finally, conventional polyurea compositions are susceptible to strong solvents, e.g., acetone, toluene, xylene, low pH acids, and high pH caustics.

Various additives have been used in an attempt to overcome the deficiencies of conventional polyureas formulations. However, no additive or component has yet been shown to overcome all of the above-referenced deficiencies.

Silicone materials have also been used in golf balls to purportedly increase the coefficient of restitution and/or durability based on their innate ability to provide materials having fairly high ultimate elongation. The use of such materials, however, has been primarily limited to interior layers of a golf ball. For example, U.S. Pat. No. 6,159,110 discloses the use of silicone polymers, silicone fluids, silicone elastomers, and silicone resins in interior golf ball layers. In addition, like conventional polyurea materials, conventional silicone materials have several characteristics that are undesirable, including low-moderate tensile strengths. Furthermore, to use silicone elastomers in the manufacture of golf balls requires covalent crosslinking because linear or branched silicone (polydimethylsiloxane) (PSX) homopolymers are viscous liquids or millable gums at room temperature.

Regardless of how the cross vulcanization is effected, the resulting thermoset silicone cannot be re-dissolved or re-melted, which severely reduces the number of options for post-fabrication operations For example, thermal forming, radio frequency welding, heat sealing and solvent bonding are essentially unavailable when working with conventional silicone elastomers. Once formed, however, the infinite network provides the polymer its rubber elasticity and characteristic physical-mechanical properties.

Epoxy resins have also been used in the production of golf balls. Generally, epoxy resins are good adhesives and can be formulated with different materials or other epoxy resins to achieve specific performance features. For example, U.S. Pat. No. 5,908,358 discloses polyurethane compositions cured with epoxy-based curing agents for improved shear resistance. Typical epoxy resin formulas do not have particularly good UV resistance. In addition, since the viscosity of epoxy is much higher than most polyester resins, typical epoxy resin formulas are slow to cure and require a post-cure (elevated temperature). Furthermore, brittleness and decreased flexibility can occur once cured.

It would be advantageous to incorporate the favorable properties of each individual material into a composition for use in golf balls so that the strengths of each material can be maximized and the weaknesses minimized. For example, there is a need in the art for a polyurea composition with a controllable reaction rate, homogenous properties, decreased shrinkage, and increased chemical resistance. In addition, there is a need in the art for a golf ball with at least one layer formed from a thermoplastic silicone-urethane. The present invention seeks to address these needs.

SUMMARY OF THE INVENTION

The present invention is directed to a golf ball including a core and a cover, wherein at least a portion of the golf ball is formed from a composition including an amine-terminated adduct comprising a backbone comprising at least one of oxirane functionality, silicone, acrylate, polyfunctional acrylate, carbonyl, caprolactone monomer, caprolactone oligomer, or a combination thereof and an isocyanate. In one embodiment, the backbone includes a silicone having at least one end group comprising oxirane functionality. In another embodiment, the backbone includes a silicone having oxirane functional end groups.

In this aspect of the invention, the amine-terminated adduct may have the following general structure:

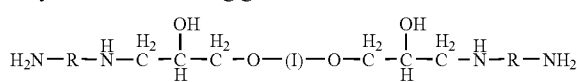

wherein R comprises a straight or branched hydrocarbon moiety, acyclic group, cyclic group, heterocyclic group, aromatic group, phenyl group, hydrocarbylene group, or a mixture thereof, and wherein (I) comprises an epoxy-silicone precursor. In one embodiment, the epoxy-silicone precursor has the following general structure:

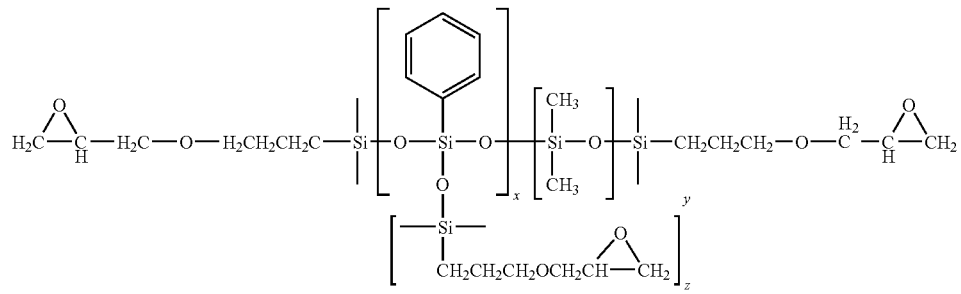

wherein x ranges from about 1 to about 10, wherein y ranges from about 10 to about 200, and wherein z ranges from about 1 to about 2. The composition of the invention may further include a curing agent including hydroxy-terminated compounds, amine-terminated compounds, or a combination thereof.

In one embodiment, the portion of the golf ball formed from the composition of the invention is the cover of the golf ball. In this regard, the cover may include an inner cover layer and an outer cover layer. In one embodiment, the outer cover layer includes the composition. In another embodiment, the inner cover layer includes a thermoplastic or thermoset material. In yet another embodiment, the inner cover layer includes a highly neutralized polymer.

The present invention is also directed to a golf ball including a core and a cover, wherein the cover is formed from a composition including an amine-terminated adduct comprising a backbone comprising a silicone compound with epoxy end caps, an isocyanate, and a curing agent. In one embodiment, the backbone of the amine-terminated adduct has the following general structure:

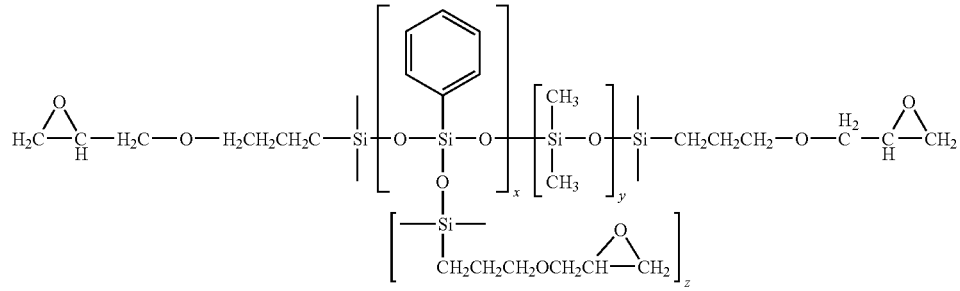

wherein x ranges from about 1 to about 10, wherein y ranges from about 10 to about 200, and wherein z ranges from about 1 to about 2. In another embodiment, the silicone compound includes dimethyl siloxane, 1,3-bis(3-aminopropyl)tetramethyl-di-siloxane, 1,4-bis(3-aminopropyldimethylsilyl)benzene, and mixtures thereof.

The present invention is also directed to a method of forming a golf ball including a core and a cover, including the following steps: providing a core; providing a precursor formed from a silicone with at least one oxirane functional endcap; forming an amine adduct by reacting an amine-terminated compound with the precursor, wherein the amine adduct comprises the precursor as the backbone; and reacting the amine adduct with isocyanate.

In one embodiment, the step of providing a precursor includes reacting a silicone compound with an oxirane functional resin. In another embodiment, the silicone compound is selected from the group consisting of dimethyl siloxane, 1,3-bis(3-aminopropyl)tetramethyl-di-siloxane, 1,4-bis(3-aminopropyldimethylsilyl)benzene, and mixtures thereof.

In this aspect of the invention, the oxirane functional resin is selected from the group consisting of 1,4-butanediol diglycidyl ether, diglycidyl ether of bisphenol A, cresyl diglycidyl ether, ethylhexyl glycidyl ether, and mixtures thereof.

The present invention is also directed to a golf ball including a core and a cover, wherein at least a portion of the golf ball is formed from a composition including:

a prepolymer comprising an isocyanate and at least one of an amine-terminated component or a hydroxy-terminated component and a curing agent comprising an amine-terminated adduct comprising a backbone comprising at least one of oxirane functionality, silicone, acrylate, polyfunctional acrylate, carbonyl, caprolactone monomer, caprolactone oligomer, or a combination thereof or a combination thereof.

In one embodiment, the backbone includes a silicone having at least one end group including oxirane functionality. In another embodiment, the backbone includes a silicone having oxirane functional end groups. The composition preferably has a gel time of about 45 seconds or greater, and more preferably about 60 seconds or greater.

In one embodiment, the portion is the cover of the golf ball. In this regard, the cover may include an inner cover layer and an outer cover layer. In one embodiment, the outer cover layer includes the composition. In another embodiment, the inner cover layer includes a thermoplastic or thermoset material. In yet another embodiment, the inner cover layer includes a highly neutralized polymer.

The present invention also relates to a golf ball having a cover formed from a composition including a prepolymer comprising urea or urethane linkages and having terminal ends comprising hydroxy groups or amine groups and a curing agent comprising an amine-terminated adduct comprising a backbone comprising oxirane functionality, a silicone compound, or a silicone compound with epoxy end caps. In this aspect of the invention, the silicone compound may include dimethyl siloxane, 1,3-bis(3-aminopropyl)tetramethyl-di-siloxane, 1,4-bis(3-aminopropyldimethylsilyl)benzene, and mixtures thereof. In addition, the backbone may include a silicone compound with oxirane functionality. In one embodiment, the prepolymer consists of urea linkages.

The present invention is also directed to a method for forming a golf ball including a core and a cover, including the following steps:
providing a core;
providing a precursor formed from a silicone with at least one oxirane functional endcap;
forming an amine adduct by reacting an amine-terminated compound with the precursor, wherein the amine adduct comprises the precursor as the backbone;
forming a prepolymer including an isocyanate-containing component and
a hydroxy-terminated component, an amine-terminated component, or a combination thereof;
reacting the amine adduct with the prepolymer to form a material; and
forming the cover from the material.

In one embodiment, the step of providing a precursor includes reacting a silicone compound with an oxirane functional resin. In another embodiment, the silicone compound is selected from the group consisting of dimethyl siloxane, 1,3-bis(3-aminopropyl)tetramethyl-di-siloxane, 1,4-bis(3-aminopropyldimethylsilyl)benzene, and mixtures thereof. In yet another embodiment, the oxirane functional resin is selected from the group consisting of 1,4-butanediol diglycidyl ether, diglycidyl ether of bisphenol A, cresyl diglycidyl ether, ethylhexyl glycidyl ether, and mixtures thereof.

The invention is also related to a use of a silicone-urethane material for forming golf balls. More particularly, the present invention is directed to the use of silicone-urethane copolymers and their blends in the formation of a golf ball core, cover or intermediate layer.

In one embodiment, the core or cover of a golf ball is formed from a thermoplastic silicone-urethane copolymer including an aromatic or aliphatic urethane hard segment with a silicone based soft segment. The thermoplastic silicone-urethane copolymers may have a silicone content from 0.1 percent to 60 percent by weight of the polymer. In one embodiment, the thermoplastic silicone-urethane copolymers have a silicone content of between about 1 percent and 20 percent by weight of the polymer. In another embodiment, the golf ball of the invention includes at least one layer formed from a thermoplastic silicone-urethane copolymer composition consisting of methane bis(4-phenylisocynate) (MDI) or hydrogenated MDI ($H_{12}$MDI), 3-hydroxypropyl terminated polydimethylsiloxane, and 1,4 butane-diol. A suitable catalyst would be used in the preparation.

In another embodiment, the hard and soft segments are combined with a polycarbonate to form a thermoplastic silicone-polycarbonate urethane copolymer. In yet another embodiment, the hard and soft segments are combined with a polyethylene oxide to form a thermoplastic silicone-polyethyleneoxide urethane copolymer.

The present invention is also directed to golf balls including at least one layer formed from a blend of silicone-polyurethane with at least one thermoplastic or thermoset polymer including ionomers, including highly neutralized ionomers, non-ionomers, polyurea, epoxy, styrenic, olefinic homo and copolymers (including metallocenes and single-site), polyamides, polyester, polyimide, polydiene, block copolymers of polyether (or ester)-ester, polyether (or ester)-amide and suitable compatibilizers. Examples of these may be found in U.S. Pat. Nos. 4,675,361, 5,428,123, 5,589,563, and 5,863,627, the entire disclosures of which are incorporated by reference herein in their entirety.

The golf ball of the invention may be a two-piece or a multi-layered golf ball having a coefficient of restitution greater than about 0.7 and an Atti compression of at least about 50. In one embodiment, a thermoplastic silicone-urethane is used for the ball cover and has a material tensile strength of greater than about 1,000 psi, preferably between about 1000 to 50,000 psi; an ultimate elongation greater than about 40 percent, preferably greater than about 400 percent;

and an initial modulus from about 300 psi to 100,000 psi, preferably from about 300 psi to 10,000 psi.

In another embodiment, the golf ball of the invention includes an intermediate layer formed from a silicone-urethane copolymer. In this aspect of the invention, the silicone-urethane copolymer has a tensile strength greater than about 3000 psi, an ultimate elongation greater than about 40 percent, preferably greater than about 400 percent, and/or an initial modulus greater than 300 psi.

DETAILED DESCRIPTION OF THE INVENTION

Figure 1:
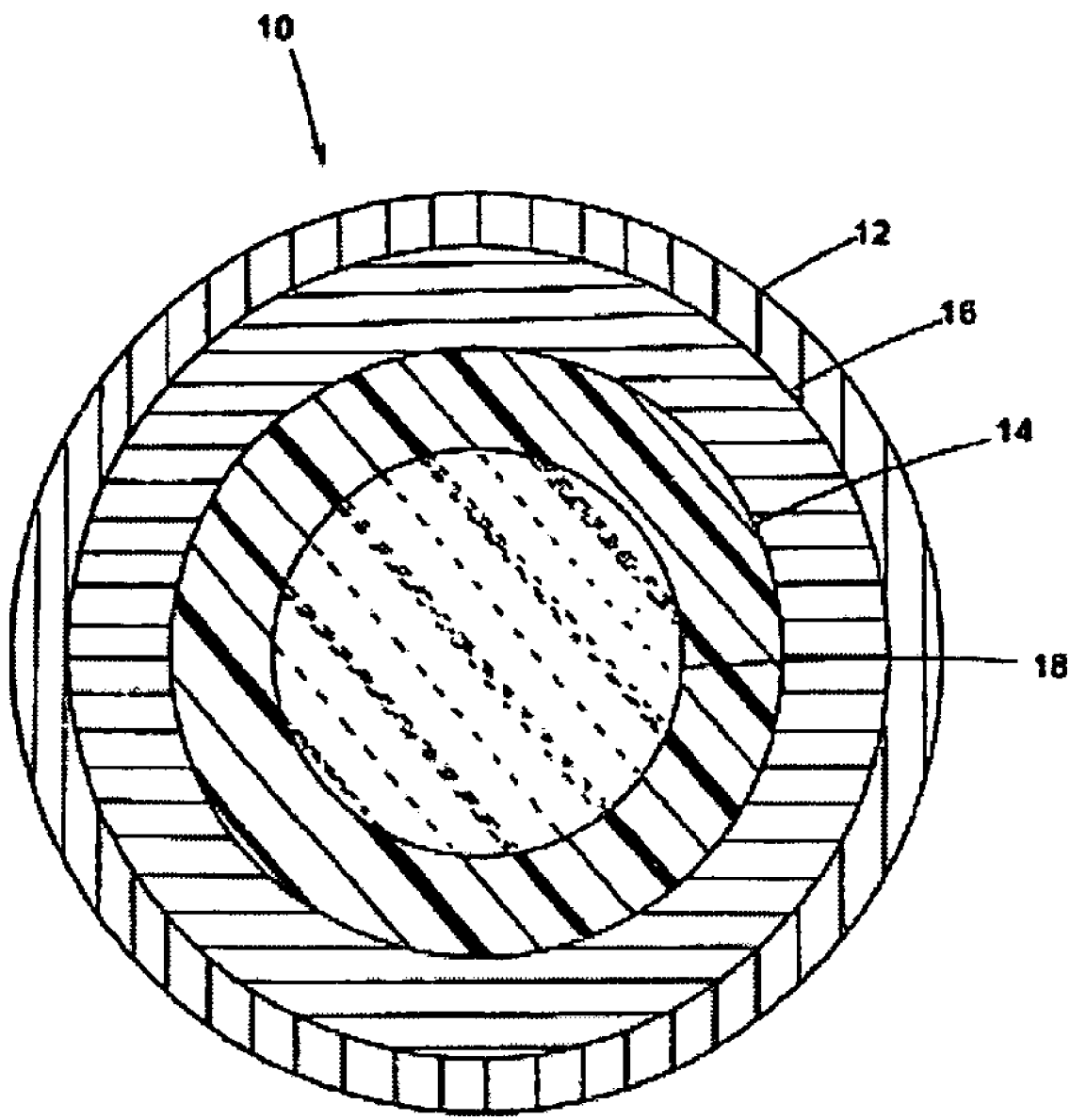
FIG. 1 is a cross-sectional view of a golf ball of the invention.

The present invention contemplates polyurea compositions formed from novel amine adducts. In particular, the amine adduct includes a backbone having (a) oxirane functionality, (b) silicone, (c) epoxy-silicone, and/or (d) an acrylate or polyfunctional acrylate, a carbonyl, and/or a caprolactone monomer or oligomer. The presence of (a), (b), (c), or (d) as the soft segment in a polyurea composition allows the reaction rates to be controlled, decreases shrinkage, and increases homogeneity, adhesion, and heat and chemical resistance. And, depending on the stoichiometric ratio of isocyanate to amine adduct, the compositions of the invention may include both urea and urethane linkages.

The compositions of the invention capitalize on the beneficial properties of the separate polymers, while compensating for, or completely overcoming, any deficiencies to arrive at a material that provides enhanced characteristics. For example, conventional polyurea compositions are generally soft and flexible, but have decreased chemical resistance and durability. On the other hand, epoxy resins, provide excellent chemical resistance properties, excellent adhesion, and versatility in crosslinking, but, once cured, result in a material with a hard "feel" when struck with a club. As such, one of the major differences between the compositions of the invention and convention polyurea compositions is that the compositions of the invention incorporate the flexibility of the polyurea-based backbone, yet have better adhesion and chemical resistance due to the epoxy functional groups.

The compositions of the invention also include silicone-urethane compositions, as discussed in greater detail below. In particular, golf ball layers may be formed from a thermoplastic silicone-urethane copolymer including an aromatic or aliphatic urethane hard segment with a silicone-based soft segment.

The compositions of the invention may be used in a variety of golf equipment. For example, various structural layers of golf balls may be formed from the compositions of the invention, as well as other golf equipment components, such as club head and shoe inserts. In addition, the compositions of the invention are contemplated for use as coatings.

Polyurea-Based Compositions of the Invention

As briefly discussed above, the compositions of the invention include an amine adduct formed from a polyamine and (a) a precursor with oxirane functionality, (b) a silicone precursor, (c) an epoxy-silicone precursor, or (d) an acrylate or polyfunctional acrylate, a carbonyl, and/or a caprolactone monomer or oligomer. The amine adduct is then reacted with an isocyanate and, depending on the stoichiometric ratio of the isocyanate to amine, a polyurea prepolymer or fully cured polyurea is formed. In another embodiment, the amine adduct of the present invention is used as a curing agent for a conventional polyurea or polyurethane prepolymer.

In the context of the present invention, the term "prepolymer" refers generally to a macromonomer or partially polymerized material formed by the reaction product of at least two components, each having a functionality that is reactive with at least one other component under the appropriate circumstances, which macromonomer or partially polymerized material can be subsequently reacted with at least one other component (which may be the same as one of the at least two components or different) to form a polymer. In particular, a "prepolymer" may refer to a material containing at least one isocyanate-containing component and at least one isocyanate-reactive component.

If a prepolymer is formed from the reaction between the amine adduct and the isocyanate, a curing agent may be used to further cure the prepolymer to form a composition including urea linkages. Depending on the curing agent used, the composition may also include urethane linkages. For example, if the curing agent is hydroxy-terminated, the composition will include urethane linkages.

Each component used to form the compositions of the invention are discussed in greater detail below. In addition, various methods for forming the system are provided.

The Precursors

The precursors of the present invention may include oxirane functional resins, i.e., epoxies, silicones, or a combination thereof. In addition, the precursor may include a methacrylate or polyfunctional acrylate, a carbonyl, a caprolactone monomer or oligomer, or a combination thereof. Each type of precursor is discussed below.

Oxirane Functional Resin Precursors

The oxirane functional resin of the present invention includes a compound having at least one functional group containing an oxirane functionality. The oxirane functionality may be obtained from any suitable compound containing the following structure:

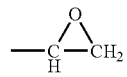

As known to those of ordinary skill in the art, this ring is also commonly referred to as an "epoxy" functionality. Examples of suitable oxirane functional resins according to the present invention include, but are not limited to, glycidols, such as glycidyl ethers and glycidyl esters, cycloaliphatic epoxy resins, and mixtures thereof. For instance, 1,4-butanediol diglycidyl ether, diglycidyl ether of bisphenol A (i.e., 2,2-bis[4-(2',3'-epoxy propoxy) phenyl]propane), cresyl diglycidyl ether, ethylhexyl glycidyl ether, and mixtures thereof are contemplated for use as the oxirane functionality according to the present invention.

Those of ordinary skill in the art are aware of the methods of forming suitable oxirane-functional compounds for use with the present invention. For example, diglycidyl ether of bisphenol A is formed by reacting bisphenol A and epichlorohydrin. Glycidyl ester resins, such as glycidyl methacrylate ester copolymers, are typically prepared by reacting an epichlorohydrin with a carboxylic acid. Cycloaliphatic epoxy resins are prepared by epoxidation of a suitable unsaturated compound with a peracid.

In one embodiment, the oxirane functionality is obtained through the use of reaction products of phenols or carboxylic acids and epichlorohydrin, reaction products of an aliphatic polyol and epichlorohydrin, oxidized polyolefins, or combinations thereof. In one embodiment, the aliphatic polyol is glycerol. The oxidized polyolefins may be oxidized using any suitable acid, e.g., peracetic acid. In another embodiment, the epoxy resin is a modified epoxy resin including halogenated bisphenol. A commercially available bisphenol A epoxy resin is EPON®, a Jeffamine resin manufactured by Huntsman Corporation of Austin, Tex., the general structure of which is shown below:

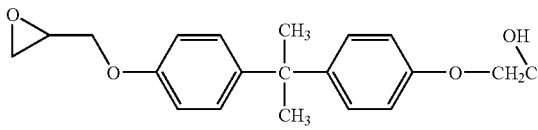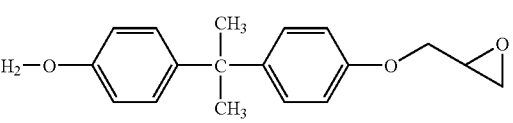

As briefly mentioned above, epoxidized esters of unsaturated alcohols and unsaturated carboxylic acids are contemplated for use as the oxirane functional resin. In one embodiment, the oxirane functional resin includes at least one of glycidyl glycidate; 2,3-epoxybutyl-3,4-epoxypentanoate; 3,4-epoxy-3,4-epoxyhexyl; 3,4-epoxypentanoate; or mixtures thereof. In another embodiment, the oxirane functional resin includes epoxidized esters of unsaturated monohydric alcohols and polycarboxylic acids, such as diglycidyl adipate; diglycidyl isophthalate; di(2,3-epoxybutyl)adipate; di(2,3-epoxybutyl)oxalate; di(2,3-epoxyhexyl)succinate; di(3,4-epoxybutyl)maleate; di(2,3-epoxyoctyl)pimelate; di(2,3-epoxybutyl)phthalate; di(2,3-epoxyoctyl)tetrahydrophthalate; di(4,5-epoxydodecyl)maleate; di(2,3-epoxybutyl) teraphthalate; di(2,3-epoxypentyl)thiodipropionate; di(5,6-epoxytetradecyl)diphenyldicarboxylate; di(3,4-epoxyheptyl)sulfonyldibutyrate; di(5,6-epoxypentadecyl) maleate; di(2,3-epoxybutyl)azelate; di(3,4-epoxybutyl) citrate; di(5,6-epoxyoctyl)cyclohexane-1,3-dicarboxylate; di(4,5-epoxyoctadecyl)malonate; tri(2,3-epoxybutyl)-1,2,4-butanetricarboxylate; and mixtures thereof.

Other examples of epoxy resins suitable for use with the present invention include, but are not limited to, epoxidized derivatives of polyethylenically unsaturated polycarboxylic acids; epoxidized polyesters that are the reaction product of an unsaturated polyhydric alcohol and/or an unsaturated polycarboxylic acid or anhydride groups; epoxidized polyethylenically unsaturated hydrocarbons; glycidyl ethers of novolac resins; and mixtures thereof.

Silicone Precursors

Suitable silicones for use with the present invention include dimethyl siloxane, 1,3-bis(3-aminopropyl)tetramethyl-di-siloxane, 1,4-bis(3-aminopropyldimethylsilyl)benzene, and mixtures thereof.

Epoxy-Silicone Precursors

The third group of suitable precursors include epoxy-silicone precursors, which are the reaction products of epoxides and silicones. In this aspect of the invention, any of the oxirane functional resins and silicones discussed above may be used to form the epoxy-silicone precursors referenced in this section.

For example, an epoxy-silicone precursor according to the invention may be formed by reacting a stoichiometric excess of an epoxide with a silicone. Commerically available examples of epoxy-silicone precursors include 2810 from OSI Specialties and SILRES® HP 1000 from Wacker Chemicals Corporation.

Acrylate or Polyfunctional Acrylate Precursors

Suitable acrylate or polyfunctional acrylates may be used as a precursor according to the present invention. In particular, suitable acrylates and polyfunctional acrylates are disclosed in U.S. Pat. Nos. 5,977,284 and 6,706,821, the disclosures of which are incorporated by reference herein. In particular, acrylate or polyfunctional acrylates for use with the present invention include, but are not limited to, polyether (meth)acrylates, polyester(meth)acrylates or epoxy(meth) acrylates, and mixtures thereof.

Carbonyl Precursors

Suitable carbonyls may be used as a precursor according to the present invention. In particular, suitable carbonyls are disclosed in U.S. Pat. No. 5,218,005, the disclosure of which is incorporated by reference herein. In particular, carbonyls for use with the present invention include, but are not limited to, The carbonyl compound may be any suitable, including those compounds having the formula

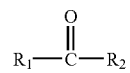

where $R_1$ and $R_2$ are independently hydrocarbyl, including linked together as cyclohydrocarbyl, or, preferably, hydrogen. Hydrocarbyl groups can include, but are not limited to alkyl groups, such as methyl, ethyl, and propyl. $R_1$ and $R_2$ can also be linked to form cycloalkyl groups, including cyclopentyl, cyclohexyl, and the like. In one embodiment, the carbonyl is formaldehyde.

Caprolactone Monomers and Oligomers

Suitable caprolactone monomers and oligomers according to the invention include, but are not limited to, bis(2-aminoethyl)ether initiated polycaprolactone, 2-(2-aminoethylamino)ethanol, 2-2(aminoethylamino)ethanol, polyoxyethylene diamine initiated polycaprolactone, propylene diamine initiated polycaprolactone, polyoxypropylene diamine initiated polycaprolactone, 1,4-butanediamine initiated polycaprolactone, trimethylolpropane-based triamine initiated polycaprolactone, neopentyl diamine initiated polycaprolactone, hexanediamine initiated polycaprolactone, polytetramethylene ether diamine initiated polycaprolactone, and mixtures thereof.

Examples of other suitable caprolactone monomers and oligomers according to the invention can be found in U.S. Patent Publication No. 2004/0266971 and U.S. Pat. No. 6,437,078, the entire disclosures of which are incorporated by reference herein in their entirety.

Amine-Terminated Components

Any amine-terminated compound available to one of ordinary skill in the art is suitable for use as the polyamine component according to the present invention. The amine-terminated compound may include amine-terminated hydrocarbons, amine-terminated polyethers, amine-terminated polyesters, amine-terminated polycarbonates, amine-terminated polycaprolactones, copolymers of polycaprolactone and polyamines, amine-terminated polyamides, and mixtures thereof.

The amine-terminated segments may be in the form of a primary amine (NH$_2$), a secondary amine (NHR), or combinations thereof. For example, the amine-terminated segments used to make the adduct may be based on an amine-terminated polyether having any one of the following generic structures:

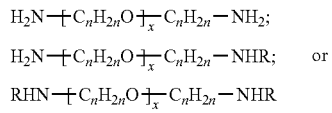

H$_2$N—$(C_nH_{2n}O)_x$—$C_nH_{2n}$—NH$_2$;

H$_2$N—$(C_nH_{2n}O)_x$—$C_nH_{2n}$—NHR;   or

RHN—$(C_nH_{2n}O)_x$—$C_nH_{2n}$—NHR where x is the chain length, i.e., 1 or greater, n is preferably about 1 to about 12, and R is any alkyl group having from about 1 to about 20 carbon atoms, preferably about 1 to about 12 carbon atoms, a phenyl group, a cyclic group, or mixture thereof. The functionality of the polyether amine may be from about 2 to about 3.

Nonlimiting examples of suitable amine-terminated compounds are disclosed in co-pending U.S. patent application Ser. No. 10/900,469, filed on Jul. 28, 2004, the entire disclosure of which is incorporated by reference herein. Examples include, but are not limited to, triethylene glycol diamine; N,N'-diisopropyl-isophorone diamine (commercially available as Jefflink® 754); polyoxyalkyleneamines such as polyoxypropylene diamine, polyoxyethylene diamines, polytetramethylene ether diamines, polyoxypropylene triamines, and polyoxyethylene triamines; 1,2-, 1,3- or 1,4-bis(sec-butylamino)benzene (commercially available as Unilink® 4100); 4,4'-bis(sec-butylamino)-diphenylmethane (commercially available as Unilink® 4200); trimethyleneglycol-di(p-aminobenzoate); trimethyleneglycol-di(o-aminobenzoate); trimethyleneglycol-di(m-aminobenzoate); polyethyleneglycol-di(p-aminobenzoate); polyethyleneglycol-di(o-aminobenzoate); polyethyleneglycol-di(m-aminobenzoate); polytetramethyleneglycol-di(p-aminobenzoate); polytetramethyleneglycol-di(o-aminobenzoate); polytetramethyleneglycol-di(m-aminobenzoate); polyaspartic amines such as N,N'-diethylmaleate-2-methyl-pentamethylene diamine (commercially available as Desmophen® NH-1220), N,N'-diethylmaleate-amino)-dicyclohexylmethane (commercially available as Desmophen® NH-1420), and N,N'-diethylmaleate-amino)-dimethyl-dicyclohexylmethane (commercially available as Desmophen® NH-1520); aromatic diamines such as 3,5-diethyl-2,4-toluenediamine and 3,5-diethyl-2,6-toluenediamine (commercially available as Ethacure® 100) and 3,5-dimethylthio-2,4-toluenediamine and 3,5-dimethylthio-2,6-toluenediamine (commercially available as Ethacure® 300); 4,4'-bis(sec-butylamino)-dicyclohexylmethane (commercially available as Clearlink® 1000) and monomers thereof; 3,3'-dimethyl-4,4'-bis(sec-butylamino)-dicyclohexylmethane (commercially available as Clearlink® 3000) and monomers thereof; 4,4'-methylene-bis(2-chloroaniline); diethylene triamine; triethylene tetramine; tetraethylene pentamine; methylene dianiline; m-phenylene diamine; diethyltoluene diamine; dimethyl dicykan; and mixtures thereof.

The molecular weight of the amine-terminated compound for use in the invention may range from about 100 to about 10,000. As used herein, the term "about" is used in connection with one or more numbers or numerical ranges, should be understood to refer to all such numbers, including all numbers in a range. In one embodiment, the amine-terminated compound is about 500 or greater, preferably about 1000 or greater, and even more preferably about 2000 or greater. In another embodiment, the amine-terminated compound molecular weight is about 8000 or less, preferably about 4,000 or less, and more preferably about 3,000 or less. For example, in one embodiment, the molecular weight of the amine-terminated compound is about 1000 to about 4000. Because lower molecular weight polyether amines may be prone to forming solid polyureas, a higher molecular weight oligomer may be used to avoid solid formation.

In order to increase the water resistance of the resultant composition, the polyamine may also be an amine-terminated compound based on a hydrophobic backbone. For example, the amine-terminated compound may be an unsaturated or saturated hydrocarbon-based amine-terminated compound, one example of which is an amine-terminated polybutadiene.

The Isocyanate Component

Any isocyanate having two or more isocyanates groups, e.g., two to four isocyanate groups, bonded to an organic radical, may be used to form the prepolymers of the present invention. The general formula of a suitable isocyanate for use with the present invention is as follows:

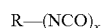

R—(NCO)$_x$ where R may be any organic radical having a valence x. In one embodiment, R is a straight or branched hydrocarbon moiety, acyclic group, cyclic group, heterocyclic group, aromatic group, phenyl group, hydrocarbylene group, or a mixture thereof. For example, R may be a hydrocarbylene group having about 6 to about 25 carbons, preferably about 6 to about 12 carbon atoms. In another embodiment, R is unsubstituted or substituted. For example, in some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Because light stability of the compositions of the invention may be accomplished in a variety of ways for the purposes of this application, i.e., through the use of saturated components, light stabilizers, whitening agents, or a mixture thereof, the isocyanate used in the prepolymer may be saturated, semi-saturated, unsaturated, or a mixture thereof. For example, isocyanates for use with the present invention include aliphatic (saturated), cycloaliphatic, aromatic aliphatic (semi-saturated), aromatic (unsaturated), any derivatives thereof, and combinations of these compounds having two or more isocyanate (NCO) groups per molecule. The term "saturated," as used herein, refers to compositions having saturated aliphatic and alicyclic polymer backbones, i.e., with no carbon-carbon double bonds. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI).

The isocyanates may be organic polyisocyanate-terminated prepolymers, low free isocyanate prepolymer, and mixtures thereof. The isocyanate-containing reactable component may also include any isocyanate-functional monomer, dimer, trimer, or polymeric adduct thereof, prepolymer, quasi-prepolymer, or mixtures thereof. In one embodiment, triisocyanates are used to form the prepolymer, which ultimately results in three-dimensional crosslinking with the curing agent.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI), such as 2,4-toluene diisocyanate and 2,6-diisocyanate; dianisidine diisocyanate; bitolylene diisocyanate; naphthalene-1,4-diisocyanate; polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4' dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; 2,4,6-toluene triisocyanate; trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Suitable saturated isocyanates include, but are not limited to, ethylene diisocyanate; propylene-1,2-diisocyanate; tetramethylene diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane(isophorone diisocyanate); isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; acetone-aminotrimethylcyclohexane-methanaime; and mixtures thereof.

Aromatic aliphatic isocyanates may also be used to form light stable materials. Examples of such isocyanates include 1,2-, 1,3-, and 1,4-xylene diisocyanate; meta-tetramethylxylene diisocyanate (m-TMXDI); para-tetramethylxylene diisocyanate (p-TMXDI); 4,4'-diphenylpropane diisocyanate; bis(4-isocyanatophenyl)methane; bis(3-methyl-4-isocyanatophenyl)methane; trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; a modified polyisocyanate derived from the above isocyanates and polyisocyanates; and mixtures thereof.

Forming the System

In general, the compositions of the invention may be formed by (a) providing or preparing a precursor, (b) reacting the precursor with an amine-terminated component to form a polyamine with (i) an epoxy backbone, (ii) a silicone backbone, (iii) an epoxy-silicone backbone, (iv) acrylate or polyfunctional acrylate backbone, (v) carbonyl backbone, or (vi) caprolactone monomer or oligomer backbone) and (c) reacting the polyamine with an isocyanate to form (i) a prepolymer or (ii) a fully cured polyurea. If step (c) results in the formation of a prepolymer, the prepolymer can then be further reacted with a suitable hydrogen donor to form a cured system.

Step (a)

As briefly described above, suitable precursors include oxirane functional resins, silicones, epoxy-silicone mixtures, acrylate or polyfunctional acrylate backbones, carbonyl backbones, and caprolactone monomer or oligomer backbones. For example, a suitable epoxy precursor is shown below:

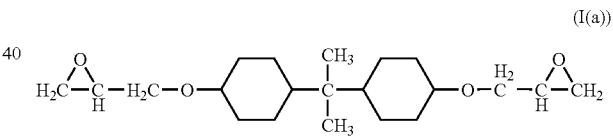

(I(a))

An example of a silicone precursor suitable for use with the present invention is shown in the structure (I(b)) below:

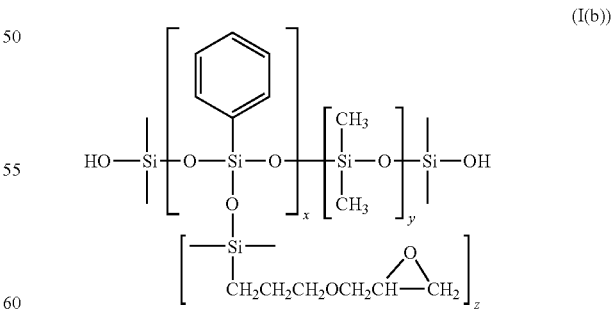

(I(b))

where x ranges from about 1 to about 10, preferably about 1 to about 5, and more preferably equals 1, y ranges from about 10 to about 200, preferably about 10 to about 50, and more preferably equals 15, and z ranges from about 1 to about 2 and preferably equals 1.

In the case of an epoxy-silicone precursor, the precursor may be made by reacting an excess of a suitable oxirane functional resin with a silicone, as shown in the example resultant structure (I(c)) below:

skill in the art, while precursor (I) represents an epoxy-silicone precursor, the present invention contemplates polyamines with epoxy backbones or silicone backbones instead of epoxy-silicone backbones as shown above.

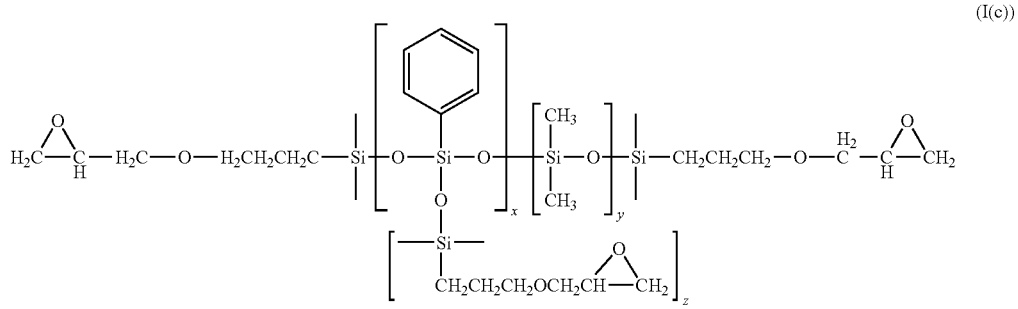

(I(c))

where x ranges from about 1 to about 10, preferably about 1 to about 5, and more preferably equals 1, y ranges from about 10 to about 200, preferably about 10 to about 50, and more preferably equals 15, and z ranges from about 1 to about 2 and preferably equals 1. As will be recognized by those of ordinary skill in the art, the structure above is merely a representation of a potential precursor for use with the present invention. The precursor may be formed from a variety of silicones and oxirane functional resins.

Step (b)

The precursor is then reacted with an amine-terminated component in a 1:1 stoichiometry to produce a polyamine adduct that includes an epoxy backbone, a silicone backbone, an epoxy-silicone backbone, an acrylate or polyfunctional acrylate backbone, a carbonyl backbone, or a caprolactone monomer or oligomer backbone.

An example of a polyamine adduct formed with an epoxy backbone is shown generally below (using precursor Ia as the backbone):

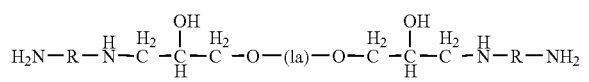

(II)

where R is any straight or branched hydrocarbon moiety, acyclic group, cyclic group, heterocyclic group, aromatic group, phenyl group, hydrocarbylene group, or a mixture thereof.

An example of a polyamine adduct (III) including an epoxy-silicone backbone is shown generally below (using precursor Ib as the backbone):

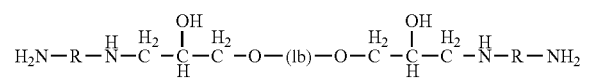

(III)

where R is any straight or branched hydrocarbon moiety, acyclic group, cyclic group, heterocyclic group, aromatic group, phenyl group, hydrocarbylene group, or a mixture thereof. As will be readily understood by those of ordinary An example of a polyamine adduct with an acrylate or polyfunctional acrylate according to the invention is shown generally below:

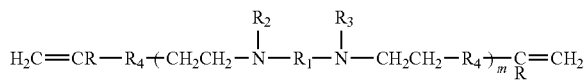

where R is hydrogen or methyl, and preferably hydrogen; $R_1$ is a polyolefin; $R_2$ and $R_3$ are independently H or substituted or unsubstituted $C_1$-$C_{25}$ alkyl; $R_4$ is an organic group derived from a polyfunctional acrylate and optionally includes side groups formed by the reaction of vinyl groups and amine terminated polyolefins; and m is from 1 to 30. In one embodiment, $R_4$ is —C(O)-Q, wherein Q is an organic group comprising at least one moiety selected from the group consisting of polyethers or polyoxyalkylenes, urethanes, epoxies, polyesters, and isocyanates.

Suitable polyamine adducts with carbonyl backbones can be formed according to the following reaction scheme:

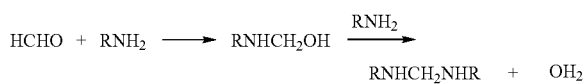

where R includes an alkyl group having from about 1 to about 20 carbon atoms, a phenyl group, a cyclic group, or mixture thereof.

Examples of a polyamine adducts with a caprolactone monomer or oligomer as a backbone are shown generally below:

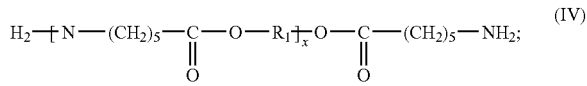

(IV)

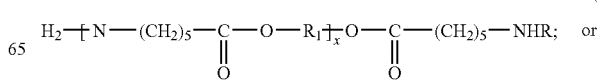

(V)

or

-continued

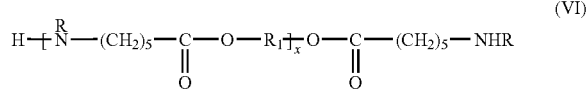
(VI)

where x is the chain length, i.e., 1 or greater, preferably about 1 to about 20, R is one of an alkyl group having from about 1 to about 20 carbons, preferably about 1 to about 12 carbons, a phenyl group, or a cyclic group, and $R_1$ is a straight or branched hydrocarbon chain including about 1 to about 20 carbons. Additional examples of suitable polyamine adducts with caprolactone monomers or oligomers as backbones are as follows:

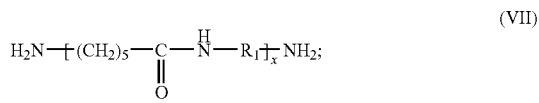
(VII)

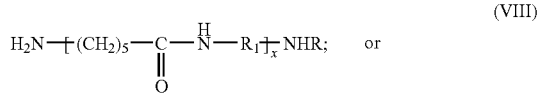
(VIII)

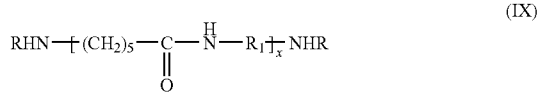
(IX)

where x is the chain length, i.e., 1 or greater, preferably about 1 to about 20, R is one of an alkyl group having from about 1 to about 20 carbons, preferably about 1 to about 12 carbons, a phenyl group, or a cyclic group, and $R_1$ is a straight or branched hydrocarbon chain including about 1 to about 20 carbons.

Step (c)

The polyamine adduct is further reacted with an isocyanate in a particular stoichiometric ratio, as shown generally in the reaction scheme below using (II) or (III) to demonstrate the reaction scheme.

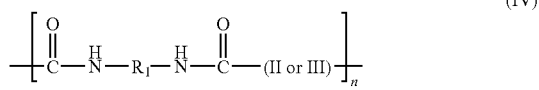
(IV)

where $R_1$ may be any straight or branched hydrocarbon moiety, acyclic group, cyclic group, heterocyclic group, aromatic group, phenyl group, hydrocarbylene group, or a mixture thereof, and where n ranges from 1 to 50.

In one embodiment, a 1:1 stoichiometric ratio of isocyanate to polyamine results in a fully cured polyurea composition. In another embodiment, a stoichiometric excess of isocyanate is used in reaction with the polyamine (II) to form a polyurea prepolymer, i.e., isocyanate end groups still exist. In such a reaction, the prepolymer is then further reacted with a curing agent or allowed to moisture cure. For example, a 5 percent stoichiometric excess of isocyanate is employed in order to allow any excess isocyanate to moisture cure. As known to those of ordinary skill in the art, other techniques, such as radiation or chemical treatment, may be employed to produce a desirable composition according to the invention.

Suitable curing agents for use in this aspect of the invention include, but are not limited to, agents having reactive functional groups such as hydroxy groups, amino groups, and combinations thereof. In particular, suitable curing agents include saturated or unsaturated hydroxy-terminated compounds and primary, secondary, and tertiary amines and adducts thereof. The type of curing agent used determines whether the polyurea composition is polyurea/urea or polyurea/urethane. For example, if an amine-terminated curing agent is used with the polyurea prepolymer, the excess isocyanate groups will react with the amine groups of the amine-terminated curing agent to create urea linkages resulting in polyurea/urea composition. In contrast, if a polyurea prepolymer cured with a hydroxy-terminated curing agent is polyurea/urethane because any excess isocyanate groups will react with the hydroxyl groups of the curing agent to create urethane linkages.

Thus, for the purposes of the invention, a polyurea/urea contains only the following urea linkages:

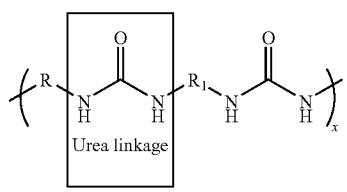
Urea linkage where x is the chain length, i.e., about 1 or greater, and R and $R_1$ are straight chain or branched hydrocarbon chain having about 1 to about 20 carbons. In contrast, a polyurea/urethane contains both the urea linkages shown above, as well as the urethane linkages shown below:

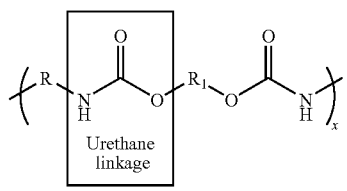
Urethane linkage where x is the chain length, i.e., about 1 or greater, and R and $R_1$ are straight chain or branched hydrocarbon chain having about 1 to about 20 carbons.

Suitable hydroxy-terminated curing agents include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; tetra-(2-hydroxypropyl)-ethylene diamine; diethylene glycol di-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; trimethylolpropane; polytetramethylene ether glycol, preferably having a molecular weight ranging from about 250 to about 3900; resorcinol-di-(beat-hydroxyethyl)ether and its derivatives; hydroquinone-di-(beta-hydroxyethyl)ether and its derivatives; 1,3-bis-(2-hydroxyethoxy)benzene; 1,3-bis-[2-(2-hydroxyethoxy)ethoxy]benzene; N,N-bis(β-hydroxypropyl) aniline; 2-propanol-1,1'-phenylaminobis; and mixtures thereof. The hydroxy-terminated curing agent may have a molecular weight of at least about 50. In one embodiment, the molecular weight of the hydroxy-terminated curing agent is about 2000 or less.

Suitable saturated hydroxy-terminated curing agents include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; tri-methylolpropane; cyclohexyldimethylol; triisopropanolamine; tetra-(2-hydroxypropyl)-ethylene diamine; diethylene glycol di-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; trimethylolpropane; polytetramethylene ether glycol having molecular weight ranging from about 250 to about 3900; and mixtures thereof. In one embodiment, the hydroxy-terminated curing agent has a molecular weight of at least 50. In another embodiment, the molecular weight of the hydroxy-terminated curing agent is about 2000 or less.

Examples of suitable amines include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof, diethylene glycol bis-(aminopropyl)ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; m-phenylene diamine; 4,4'-bis-(sec-butylamino)-diphenylmethane and derivatives thereof; diaminophenyl sulphone; 1,4-bis-(sec-butylamino)-benzene; 1,2-bis-(sec-butylamino)-benzene; N,N'-dialkylamino-diphenylmethane; tri-methyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-diaminocyclohexylmethane; piperidine; tertiary amines, such as triethylamine, benzyldimethylamine, dimethylaminomethyl phenol, tri(dimethylamino-methyl)phenol, and tri-2-ethylhexoate salt of tri(dimethylaminomethyl)phenol; and mixtures thereof. In addition, amine-glycidyl adducts, amine-ethylene oxide adducts, caprolactam, and cyanoethylation products are contemplated for use in curing the epoxy groups.

In one embodiment, the amine-terminated curing agent is 4,4'-bis-(sec-butylamino)-dicyclohexylmethane. In another embodiment, the amine-terminated curing agent is a polyoxypropylene glycol-based diamine, commercially available from Huntsman under the tradename Jeffamine® D-2000.

The amine-terminated curing agent may have a molecular weight of about 64 or greater. And, in one embodiment, the molecular weight of the amine-curing agent is about 2000 or less. In addition, any of the amine-terminated compounds discussed above with respect to the prepolymer may be used as the curing agent.

Of the list above, the saturated amine-terminated curing agents suitable for use with the present invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl) ether; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-(propylamine); monoethanolamine, diethanolamine; triethanolamine; monoisopropanolamine, diisopropanolamine; triisopropanolamine; isophoronediamine; N,N'-diisopropylisophorone diamine and mixtures thereof. In addition, polyamidoamines are contemplated for use as the curing agent in the present invention.

When the curing agent is amine-terminated, those of ordinary skill in the art are aware that the amines react with the isocyanate groups through the active amine hydrogen, e.g., each primary amine is theoretically capable of reacting with two isocyanate groups and each secondary amine group is capable of reacting with one isocyanate group.

To further improve the shear resistance of the resulting polyurea elastomers, a trifunctional curing agent can be used to help improve cross-linking. Preferably, a triol such as tri-methylolpropane or a tetraol such as N,N,N',N'-tetrakis(2-hydroxylpropyl) ethylenediamine may be added to the formulations.

In another aspect of the invention, a polyurethane prepolymer or polyurea prepolymer formed from the reaction of a polyol and an isocyanate or a polyamine and an isocyanate, respectively, is cured with an amine adduct of the present invention. In other words, the prepolymer does not necessarily include an amine adduct of the invention, but, rather, the prepolymer is formed or obtained from conventional aromatic or aliphatics components and then cured using an amine adduct of the present invention. For example, the polyamine adduct (II) shown above is suitable for use as a curing agent. Likewise, the curing agent may be an amine adduct formed a reaction between an amine moiety and an acrylate or polyfunctional acrylayer. Those of ordinary skill in the art are aware of methods to alter the reactivity of a primary amine moiety by reacting with a suitable agent to produce a secondary amine adduct. Without being bound by any theory, it is believed that the use of polyamine adducts as curing agents reduces vapor pressure, provides practical mixing ratios, and reduces amine bloom.

In an alternate embodiment, the prepolymer is formed using the amine adduct of the invention and an isocyanate and then cured using an amine adduct of the present invention. In this scenario, the amine adduct used in the prepolymer may be the same or different from the amine adduct used to cure the prepolymer.

The gel time of such compositions is preferably greater than about 45 seconds, more preferably greater than about 50 seconds. In one embodiment, the gel time is about 60 seconds or greater. In another embodiment, the gel time is about 75 seconds or greater.

Silicone-Urethane Materials According to the Invention

Thermoplastic silicone-polyether urethane copolymers suitable for use with the present invention include PurSil™; silicone-polycarbonate urethane copolymers available include CarboSil™; and silicone-polyethylene oxide urethane copolymers include Hydrosil™. The silicone content of the copolymers may range from less than 0.1 percent up to the total soft-segment content of the polymer, which can be from 20 to 65 percent depending on copolymer hardness.

Many of the silicone containing urethane copolymers demonstrate previously unavailable combinations of properties. For instance, as shown in Table 1 below, aromatic silicone-polyether urethanes have a higher modulus at a given Shore hardness than do conventional polyether urethanes, i.e., the higher the silicone content, the higher the modulus. The aliphatic silicone-polyether urethanes, on the other hand, have a very low modulus and high ultimate elongation, which is typical of silicone homopolymers or even natural rubber (Table 2).

The silicone-urethane copolymers of the present invention exhibit tensile strengths of at least 300 psi and preferably at least 1000 to 50,000 psi. Some of the copolymers appear to have an unusual combination of toughness (high tensile strength and elongation) and very low initial modulus. For example, the ultimate elongation of the silicone-urethane materials of the present invention is about 20 percent to about 1000 percent with a preferred elongation of at least about 400 percent to about 800 percent. The initial modulus of the silicone-urethane copolymer is about 300 to 150,000 psi and preferably between 10,000 to 80,000 psi. This makes them very attractive as high-performance substitutes for conventional cross-linked silicone elastomers.

Depending on the silicone content, the modulus can be as low as that of natural rubber latex, with a tensile strength benefits of silicone are obtained at low to moderate silicone concentrations, which can preserve the mechanical strength of the parent polyurethane. Generally, the greater the content of silicone, the lower the tensile strength.

U.S. Pat. Nos. 5,863,627 and 5,530,083, issued to Ward, which are incorporated by reference herein in their entirety, describe in great detail how the commercially available products PurSil™, CarboSil™, and Hydrosil™ are processed. The high-strength thermoplastic elastomers containing silicone in the soft segment, such as that described by PurSil™ and shown in Table 1, are prepared through a multi-step bulk synthesis. In this synthesis, the hard segment is an aromatic urethane MDI (4,4'-diphenylmethane diisocynanate-butanediol) with a low molecular weight glycol extender BD (butanediol) and the soft segment is comprised of polytetramethylene oxide (PTMO) including polydimethylsiloxane (PSX).

In addition to polydimethylsiloxane (PSX), other suitable Surface-Modifying End Group (SMEs), which may be used alone or in combination with one another, include hydrocarbons, fluorocarbons, fluorinated polyethers, polyalkylene oxides, various sulphonated groups, and the like. SMEs are surface-active oligomers covalently bonded to the base polymer during synthesis. When the aromatic or aliphatic urethane hard segment is combined with a hydrocarbon soft segment SME, a hydrocarbon-polyurethane is produced, which has excellent properties for use in golf balls.

The use of surface modifying additives (SMAs) blended with the base polymer before fabrication is well known in the art. During and after fabrication, the SMA migrates to the surface in high concentration. This dramatically changes the outermost molecular monolayers to produce a desired surface quality.

Material properties for compositions of PurSil™ and CarboSil™ are disclosed in the following tables:

TABLE 1

PURSIL ™ (FROM AROMATIC URETHANE)

| | | Comparative Example | #1 | #2 | #3 | #4 |
|---|---|---|---|---|---|---|
| PurSil ™ | | 0% Si | 10% Si | 20% Si | 40% Si | 60% Si |
| Hard Segment | | MDI-BD | MDI-BD | MDI-BD | MDI-BD | MDI-BD |
| Organic Soft Segment | | PTMO | PTMO | PTMO | PTMO | None* |
| Properties | Tensile Strength (psi) | 5700 | 6515 | 5710 | 3930 | 2275 |
| | Ultimate Elongation (%) | 815 | 760 | 665 | 580 | 410 |
| | Initial Modulus (psi) | 2785 | 2880 | 2930 | 3510 | 4920 |

Note:
The percent silicone is amount added to PTMO soft segment.
*PurSil ™ 60 has 60% of silicone as the total soft segment.

equal to or greater than that of natural rubber. Increased modulus in the aromatic series is due to enhanced hard-segment/soft segment phase separation resulting from the very low solubility parameter of silicone. The converse may be true in the case of aliphatic hard segments, which appear to be more compatible with soft segments containing silicone.

In both aromatic and aliphatic silicone-polyurethane copolymers, optical transparency is possible over a wide range of total silicone concentration, i.e., less than 1 and greater than 65 percent by weight. This is quite different from typical optical properties of hybrid or interpenetrating network systems, in which the gross phase separation of silicone often results in opacity to visible light. This is a very desired property in the use of ball covers. Many of the synergistic In Table 2, the hard segment synthesis incorporates an aliphatic urethane HMDI-BD (dicyclohexylmethane 4,4'-diisocyanate) and the low molecular weight glycol extender BD.

TABLE 2

PURSIL ™ (FROM ALIPHATIC URETHANE)

| | Comparative Example | #1 | #2 |
|---|---|---|---|
| PurSil ™ | 0% Si | 5% Si | 10% Si |
| Hard Segment | HMDI-BD | HMDI-BD | HMDI-BD |
| Organic Soft Segment | PTMO | PTMO | PTMO |

TABLE 2-continued

PURSIL ™ (FROM ALIPHATIC URETHANE)

|            |                         | Comparative Example | #1   | #2   |
|------------|-------------------------|---------------------|------|------|
| Properties | Tensile Strength (psi)  | 5570                | 6225 | 6255 |
|            | Ultimate Elongation (%) | 715                 | 810  | 835  |
|            | Initial Modulus (psi)   | 1240                | 465  | 370  |

Note:
Percent silicone is amount added to PTMO soft segment.

In Table 3, the synthesis process is carried out wherein a hydroxyl-terminated polycarbonate (PC) is substituted in the soft segment for the PSX and PTMO. This is the CarboSil™ product, which along with PurSil™ can be fabricated by conventional extrusion, injection molding or compression molding techniques.

TABLE 3

CARBOSIL ™

|                    |                          | Comparative Example | #1      | #2      | #3      |
|--------------------|--------------------------|---------------------|---------|---------|---------|
| CarboSil ™         |                          | 0% Si               | 10% Si  | 20% Si  | 40% Si  |
| Hard Segment       |                          | MDI-BD              | MDI-BD  | MDI-BD  | MDI-BD  |
| Organic Soft Segment |                        | PC                  | PC      | PC      | PC      |
| Properties         | Tensile Strength (psi)   | 7270                | 7140    | 5720    | 3250    |
|                    | Ultimate Elongation (%)  | 580                 | 500     | 480     | 305     |
|                    | Initial Modulus (psi)    | 1170                | 6260    | 4125    | 6402    |

The above materials are heat-sealable, readily blended with fillers, and easily post-formed. Melt processing conditions are similar to conventional thermoplastic polyurethanes. Since polyurethanes are generally hydrophilic materials, pellets should be dried in a desiccant-bed-type dehumidifying hopper dryer prior to processing. The final moisture content should be less than 0.01%.

Composition Additives

Additional materials conventionally included in polyurethane and polyurea compositions may be added to the compositions of the invention in any of the steps discussed above. For example, catalysts may be used to promote the reaction between the prepolymer and the curing agent. Suitable catalysts include, but are not limited to bismuth catalyst; zinc octoate; stannous octoate; tin catalysts such as bis-butyltin dilaurate (DABCO® T-12 manufactured by Air Products and Chemicals, Inc.), bis-butyltin diacetate (DABCO® T-1); stannous octoate (DABCO® T-9); tin (II) chloride, tin (IV) chloride, bis-butyltin dimethoxide (FASCAT®-4211), dimethyl-bis[1-oxonedecyl)oxy]stannane (FORMEZ®D UL-28), di-n-octyltin bis-isooctyl mercaptoacetate (FORMEZ® UL-29); amine catalysts such as triethylenediamine (DABCO® 33-LV), triethylamine, and tributylamine; organic acids such as oleic acid and acetic acid; delayed catalysts such as POLYCAT™ SA-1, POLYCAT™ SA-2, POLYCAT™, and the like; and mixtures thereof. In one embodiment, the catalyst is bis-butyltin dilaurate.

If used, the catalyst is preferably added in an amount sufficient to catalyze the reaction of the components in the reactive mixture. In one embodiment, the catalyst is present in an amount from about 0.001 percent to about 5 percent by weight of the composition. For example, when using a tin catalyst, such as bis-butyltin dilaurate, the catalyst is preferably present in an amount from about 0.005 percent to about 1 percent. In another embodiment, the catalyst is present in an amount of about 0.05 weight percent or greater. In another embodiment, the catalyst is present in an amount of about 0.5 weight percent or greater.

Use of low levels of tin catalysts, typically from about 0 to about 0.04 weight percent of the total composition, requires high temperatures to achieve a suitable reaction rate, which may result in degradation of the prepolymer. Increasing the amount of catalysts to unconventional high levels enables the reduction in process temperatures while retaining comparable cure stages. Use of the higher catalyst level also allows the mixing speeds to be reduced. Thus, in one embodiment, the tin catalyst is present in an amount from about 0.01 percent to about 0.55 percent by weight of the composition. In another embodiment, about 0.05 percent to about 0.4 percent of tin catalyst is present in the composition. In yet another embodiment, the tin catalyst is present in an amount from about 0.1 percent to about 0.25 percent.

In addition, wetting agents, coloring agents, optical brighteners, crosslinking agents, whitening agents such as $TiO_2$ and ZnO, UV absorbers, hindered amine light stabilizers, defoaming agents, processing aids, surfactants, and other conventional additives may be included in the compositions of the invention. For example, wetting additives may be added to the modified curative blends of the invention to more effectively disperse the pigment(s). Suitable wetting agents are available from Byk-Chemle and Crompton Corporation, among others.

Antioxidants, stabilizers, softening agents, plasticizers, including internal and external plasticizers such as caprolactone or caprolactam, impact modifiers, foaming agents, density-adjusting fillers, reinforcing materials, and compatibilizers may also be added to any composition of the invention. Those of ordinary skill in the art are aware of the purpose of these additives and the amounts that should be employed to fulfill those purposes.

Density-Adjusting Filler(s)

Fillers may be added to the polyurethane and polyurea compositions of the invention to affect Theological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

Fillers may also be used to modify the weight of the core or at least one additional layer for specialty balls, e.g., a lower weight ball is preferred for a player having a low swing speed.

Blowing or Foaming Agent(s)

The compositions of the invention may be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Furthermore, the use of liquid nitrogen for foaming, as disclosed in U.S. Pat. No. 6,386,992, which is incorporated by reference herein, may produce highly uniform foamed compositions for use in the present invention.

Either injection molding or compression molding may be used to form a layer including a foamed polymeric material. For example, a composition of the present invention can be thermoformed and, thus, can be compression molded. For compression molded grafted metallocene catalyzed polymer blend layers, half-shells may be made by injection molding a grafted metallocene catalyzed polymer blend in a conventional half-shell mold or by compression molding sheets of foamed grafted metallocene catalyzed polymer. The half-shells are placed about a previously formed center or core, cover, or mantle layer, and the assembly is introduced into a compression molding machine, and compression molded at about 250° F. to 400° F. The molded balls are then cooled while still in the mold, and finally removed when the layer of grafted metallocene catalyzed polymer blend is hard enough to be handled without deforming. Additional core, mantle, and cover layers are then molded onto the previously molded layers, as needed, until a complete ball is formed.

Light Stabilizers

The compositions of the invention may include both saturated and unsaturated components. And, while the use of only saturated components aids in avoiding the yellowing over time that occurs with unsaturated components, the use of various UV absorbers and light stabilizers to any of the above compositions may help to also maintain the tensile strength, elongation, and color stability. The use of light stabilizing components also may assist in preventing cover surface fractures due to photodegredation.

As such, the compositions of the invention may contain at least one light stabilizing component to prevent significant yellowing from unsaturated components contained therein. The use of a light stabilizer is preferred, for instance, for compositions having a difference in yellowness ($\Delta Y$) of about 15 or greater, but also may be added to compositions having a difference in yellowness of from about 12 to about 15. As used herein, light stabilizer may be understood to include hindered amine light stabilizers, ultraviolet (UV) absorbers, and antioxidants.

Suitable light stabilizers include, but are not limited to, TINUVIN® 292, TINUVIN® 328, TINUVIN® 213, TINUVIN® 765, TINUVIN® 770 and TINUVIN® 622. TINUVIN® products are available from Ciba Specialty Chemicals of Tarrytown, N.Y. In one embodiment, the light stabilizer is UV absorber TINUVIN® 328, which is useful with aromatic compounds. In another embodiment, hindered amine light stabilizer TINUVIN® 765 is used with aromatic or aliphatic compounds. In addition, TINUVIN® 292 may also be used with the aromatic or aliphatic compositions of the invention.

As discussed above, dyes, as well as optical brighteners and fluorescent pigments may also be included in the golf ball covers produced with polymers formed according to the present invention. Such additional ingredients may be added in any amounts that will achieve their desired purpose.

To further improve the shear resistance and heat resistance of the resulting polyurea elastomers, a multi-functional curing agent can be used to help improve cross-linking. In one embodiment of the present invention, the multi-functional curing agent is modified with a compatible freezing point depressing agent as detailed above. For example, a triol such as trimethylolpropane or a tetraol such as N,N,N',N'-tetrakis (2-hydroxylpropyl) ethylenediamine may be added to the composition. In one embodiment, a primary diamine, such as 3,3'-dimethyl-4,4'-diaminodicyclohexylmethane or 4,4'-diaminodicyclohexylmethane is added to the polyurea composition. Useful triamine curing agents for improving the crosslinking of polyurea elastomers include, but are not limited to: propylene oxide-based triamines; trimethylolpropane-based triamines; glycerin-based triamines; N,N-bis {2-[(aminocarbonyl)amino]ethyl}-urea; N,N',N'''-tris(2-aminoethyl)-methanetriamine; N1-(5-aminopentyl)-1,2,6-hexanetriamine; 1,1,2-ethanetriamine; N,N',N'-tris(3-aminopropyl)-methanetriamine; N1-(2-aminoethyl)-1,2,6-hexanetriamine; N1-(10-aminodecyl)-1,2,6-hexanetriamine; 1,9,18-octadecanetriamine; 4,10,16,22-tetraazapentacosane-1,13,25-triamine; N1-{3-[[4-[(3-aminopropyl) amino]butyl] amino]propyl}-1,2,6-hexanetriamine; di-9-octadecenyl-(Z, Z)-1,2,3-propanetriamine; 1,4,8-octanetriamine; 1,5,9-nonanetriamine; 1,9,10-octadecanetriamine; 1,4,7-heptanetriamine; 1,5,10-decanetriamine; 1,8,17-heptadecanetriamine; 1,2,4-butanetriamine; propanetriamine; 1,3,5-pentanetriamine; N1-{3-[[4-[(3-aminopropyl) amino]butyl]amino]propyl}-1,2,6-hexanetriamine; N1-{4-[(3-aminopropyl)amino]butyl}-1,2,6-hexanetriamine; 2,5-dimethyl-1,4,7-heptanetriamine; N1-(6-aminohexyl)-1,2,6-hexanetriamine; 6-ethyl-3,9-dimethyl-3,6,9-undecanetriamine; 1,5,11-undecanetriamine; 1,6,11-undecanetriamine; N,N-bis(aminomethyl)-methanediamine; N,N-bis(2-aminoethyl)-1,3-propanediamine; methanetriamine; N1-(2-aminoethyl)-N-2-(3-aminopropyl)-1,2,5-pentanetriamine; N1-(2-aminoethyl)-1,2,6-hexanetriamine; 2,6, 11-trimethyl-2,6,11-dodecanetriamine; 1,1,3-propanetriamine; 6-(aminomethyl)-1,4,9-nonanetriamine; 1,2,6-hexanetriamine; N2-(2-aminoethyl)-1,1,2-ethanetriamine; 1,3,6-hexanetriamine; N,N-bis(2-aminoethyl)-1,2-ethanediamine; 3-(aminomethyl)-1,2,4-butanetriamine; 1,1,1-ethanetriamine; N1,N1-bis(2-aminoethyl) 1,2-propanediamine; 1,2,3-propanetriamine; 2-methyl-1,2,3-propanetriamine; and mixtures thereof.

Composition Blends

The compositions of the invention preferably include from about 1 percent to about 100 percent of the polyurea-based polymers or polyurethane-based polymers, however, the compositions may also be blended with other materials. In one embodiment, the composition contains about 10 percent to about 90 percent polyurea-based polymer or polyurethane-based polymer, preferably from about 10 percent to about 75 percent polyurea-based polymer or polyurethane-based polymer, and contains about 10 percent to 10 percent, more preferably from about 90 percent to about 25 percent other polymers and/or other materials as described below. Unless otherwise stated herein, all percentages are given in percent by weight of the total composition of the golf ball layer in question.

Other polymeric materials suitable for blending with the compositions of the invention include castable thermoplastics, cationic and anionic urethane ionomers and urethane epoxies, polyurethane ionomers, polyurea ionomers, epoxy resins, polyethylenes, polyamides and polyesters, polycarbonates, polyacrylin, siloxanes and epoxy resins or their blends, and mixtures thereof. One of ordinary skill in the art would be well aware of methods to blend the polymeric materials with the composition of the invention.

Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870. In particular, the polyureas of U.S. Pat. No. 5,484,870 are prepared by reacting a polyisocyanate and a polyamine curing agent to yield polyurea, which are distinct from the polyureas of the present invention which are formed from a polyurea prepolymer and curing agent. Examples of suitable polyurethanes cured with epoxy group containing curing agents are disclosed in U.S. Pat. No. 5,908,358. The disclosures of the above patents are incorporated herein by reference in their entirety.

The polyurea-based compositions and polyurethane-based compositions of the invention may also be in the form of a blend with at least one highly neutralized polymer. For example, a prepolymer can be chain extended with a curing agent and then blended with a highly neutralized polymer, as well as rosin-modified ionomers and bi-modal ionomers, as disclosed in U.S. patent application Ser. Nos. 11/130,243 and 11/135,288. Suitable highly neutralized polymers include, but are not limited to, polymers containing α,β-unsaturated carboxylic acid groups, or the salts thereof, that have been highly neutralized by organic fatty acids. The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoleic, or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending). The acid moieties of the highly-neutralized polymers ("HNP"), typically ethylene-based ionomers, are preferably neutralized greater than about 70 percent, more preferably greater than about 90 percent, and most preferably at least about 100 percent.

Golf Ball Construction

The compositions of the present invention may be used with any type of ball construction including, but not limited to, one-piece, two-piece, three-piece, and four-piece designs, a double core, a double cover, an intermediate layer(s), a multilayer core, and/or a multi-layer cover depending on the type of performance desired of the ball. That is, the compositions of the invention may be used in a core, intermediate layer, and/or cover of a golf ball, each of which may have a single layer or multiple layers. As used herein, the term "multilayer" means at least two layers.

Non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Golf Ball Core Layer(s)

The cores of the golf balls formed according to the invention may be solid, semi-solid, hollow, fluid-filled or powder-filled, one-piece or multi-component cores. As mentioned above, the core may be formed including the compositions of the invention. In the alternative, the core may be formed from any conventional core material known to one of ordinary skill in that art. For example, thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers may be used to form the core.

In one embodiment, the golf ball core is formed from a composition including a base rubber (natural, synthetic, or a combination thereof), a crosslinking agent, and a filler. In another embodiment, the golf ball core is formed from a reaction product that includes a cis-to-trans catalyst, a resilient polymer component having polybutadiene, a free radical source, and optionally, a crosslinking agent, a filler, or both. Various combinations of polymers, cis-to-trans catalysts, fillers, crosslinkers, and a source of free radicals, such as those disclosed in co-pending U.S. Patent Publication No. 2003/0119989, the entire disclosure of which is incorporated by reference herein, may be used to form the reaction product.

As used herein, the terms core and center are generally used interchangeably to reference the innermost component of the ball. In some embodiments, however, the term "center" is used when there are multiple core layers, i.e., a center and an outer core layer.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer can include any materials known to those of ordinary skill in the art including thermoplastic and thermosetting materials. In one embodiment, the intermediate layer is formed, at least in part, from the compositions of the invention.

The intermediate layer(s) may also likewise include one or more homopolymeric or copolymeric thermoset and thermoplastic materials, such as vinyl resins, polyolefins, polyurethanes, polyureas, polyamides, acrylic resins and blends of these resins with polyvinyl chloride, elastomers, and the like, olefinic thermoplastic rubbers, block copolymers of styrene and butadiene, isoprene or ethylene-butylene rubber, copoly (ether-amide), polyphenylene oxide resins or blends of polyphenylene oxide with high impact polystyrene, polyesters, and mixtures thereof.

In one embodiment, the intermediate layer includes polymers, such as ethylene, propylene, butene-1 or hexene-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers, and blends thereof.

For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

In another embodiment, the intermediate layer includes at least one primarily or fully non-ionomeric thermoplastic material. Suitable non-ionomeric materials include polyamides and polyamide blends, grafted and non-grafted metallocene catalyzed polyolefins or polyamides, polyamide/ionomer blends, polyamide/nonionomer blends, polyphenylene ether/ionomer blends, and mixtures thereof. Examples of grafted and non-grafted metallocene catalyzed polyolefins or polyamides, polyamide/ionomer blends, polyamide/non-ionomer blends are disclosed in co-pending U.S. Patent Publication No. 2003/0078348, the entire disclosure of which is incorporated by reference herein. Another example of a polyamide-nonionomer blend is a polyamide and non-ionic polymers produced using non-metallocene single-site catalysts. Examples of suitable single-site catalyzed polymers are disclosed in co-pending U.S. Pat. No. 6,476,130, of which the entire disclosure is incorporated by reference herein.

Golf Ball Cover(s)

The cover layer may be formed, at least in part, from at least one of the compositions of the invention. For example, a cover layer may include a polyurea-based composition formed from an oxirane functional intermediate and a curing agent. In an alternate embodiment, the cover layer may be formed from a polyurethane-based composition of the invention.

When the compositions of the invention are incorporated into a core or intermediate/inner cover layer, the cover layer may also be formed from a composition of the invention or, the cover layer may be formed from one or more of the homopolymeric or copolymeric materials discussed in the section above pertaining to the intermediate layer. The cover may also be at least partially formed from the polybutadiene reaction product discussed above with respect to the core.

Methods of Forming Layers

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

When the compositions of the invention are incorporated into a cover layer, for example, the polyurea-based and polyurethane-based materials of the invention may be applied over the inner ball using a variety of application techniques such as spraying, compression molding, dipping, spin coating, casting, or flow coating methods that are well known in the art. In one embodiment, the compositions of the invention are formed over an inner ball using a combination of casting and compression molding.

The cores of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded. Furthermore, U.S. Pat. Nos. 6,180,040 and 6,180,722 disclose methods of preparing dual core golf balls. The disclosures of these patents are hereby incorporated by reference in their entirety.

The intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like.

U.S. Pat. No. 5,733,428, the entire disclosure of which is hereby incorporated by reference, discloses a method for forming a polyurethane-based cover on a golf ball core. Because this method relates to the use of both casting thermosetting and thermoplastic material as the golf ball cover, wherein the cover is formed around the core by mixing and introducing the material in mold halves, the polyurea-based compositions may also be used employing the same casting process.

Similarly, U.S. Pat. No. 5,006,297 and U.S. Pat. No. 5,334,673 both also disclose suitable molding techniques that may be utilized to apply the polyurea-based and polyurethane-based compositions of the invention. However, the method of the invention is not limited to the use of these techniques; other methods known to those skilled in the art may also be employed. For instance, other methods for holding the ball core may be utilized instead of using a partial vacuum.

Golf Ball Post-Processing

The golf balls of the present invention may be painted, coated, or surface treated for further benefits. In addition, trademarks or other indicia may be stamped, i.e., pad-printed, on the outer surface of the ball cover, and the stamped outer surface may then be treated with at least one clear coat to give the ball a glossy finish and protect the indicia stamped on the cover. Furthermore, the golf balls of the invention may be subjected to dye sublimation, wherein at least one golf ball component is subjected to at least one sublimating ink that migrates at a depth into the outer surface and forms an indicia, as disclosed in U.S. Patent Publication No. 2003/0106442, the entire disclosure of which is incorporated by reference herein.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention. It should be understood that the ranges herein are meant to be intermixed with each other, i.e., the low end of one range may be combined with a high end of another range.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used. Preferably, the overall diameter of the core and all intermediate layers is about 80 percent to about 98 percent of the overall diameter of the finished ball.

The core, which may include more than one layer, may have a diameter ranging from about 0.09 inches to about 1.65 inches. In one embodiment, the diameter of the core of the present invention is about 1.2 inches to about 1.630 inches. In another embodiment, the core has a diameter of about 1.55 inches to about 1.65 inches. For example, in one embodiment, the core has a diameter of 1.5 inches to 1.62 inches.

The cover typically has a thickness to provide sufficient strength, good performance characteristics, and durability. In one embodiment, the cover thickness is from about 0.02 inches to about 0.35 inches. The cover preferably has a thickness of about 0.02 inches to about 0.12 inches, preferably about 0.1 inches or less. When the compositions of the invention are used to form the outer cover of a golf ball, the cover may have a thickness of about 0.05 inches or less, preferably from about 0.02 inches to about 0.05 inches, more preferably abut 0.02 inches and about 0.035 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater, and more preferably 0.02 inches to 0.1 inches. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less. The core and intermediate layer(s) together form an inner ball preferably having a diameter of about 1.48 inches or greater for a 1.68-inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other. Also, as known to those of ordinary skill in the art, test results of physical and electrical properties of materials may be influenced by temperature and relative humidity. As such, ASTM-D618, Procedure A is used to standardize the humidity conditions, as well as the temperature, to which the materials are subjected prior to and during testing.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

Compression

Compression values are dependent on the diameter of the component being measured. The Atti compression of the core, or portion of the core, of golf balls prepared according to the invention is preferably less than about 80, more preferably less than about 75. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to 100. In yet another embodiment, the compression of the golf balls of the invention is about 75 or greater and about 95 or less. For example, a preferred golf ball of the invention may have a compression from about 80 to about 95.

Initial Velocity and COR

There is currently no USGA limit on the COR of a golf ball, but the initial velocity of the golf ball cannot exceed 250±5 feet/second (ft/s). Thus, in one embodiment, the initial velocity is about 245 ft/s or greater and about 255 ft/s or greater. In another embodiment, the initial velocity is about 250 ft/s or greater. In one embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range.

As a result, of the initial velocity limitation set forth by the USGA, the goal is to maximize COR without violating the 255 ft/s limit. The COR of a ball is measured by taking the ratio of the outbound or rebound velocity to the incoming or inbound velocity. In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

In addition, the inner ball preferably has a COR of about 0.780 or more. In one embodiment, the COR is about 0.790 or greater.

Flexural Modulus

Accordingly, it is preferable that the golf balls of the present invention have an intermediate layer with a flexural modulus of about 500 psi to about 500,000 psi. More preferably, the flexural modulus of the intermediate layer is about 1,000 psi to about 250,000 psi. In one embodiment, the flexural modulus of the intermediate layer is about 2,000 psi to about 200,000 psi. In another embodiment, the flexural modulus of the intermediate layer is about 30,000 psi to about 80,000 psi. The flexural modulus is measured according to the procedure set forth in ASTM-D790-03, Procedure B.

The flexural modulus of the cover layer is preferably about 2,000 psi or greater, and more preferably about 5,000 psi or greater. In one embodiment, the flexural modulus of the cover is from about 10,000 psi to about 150,000 psi. For example, the flexural modulus of the cover layer may be from about 10,000 psi to about 70,000 psi, from about 12,000 psi to about 60,000 psi, or from about 14,000 psi to about 50,000 psi.

Moisture Vapor Transmission

The moisture vapor transmission of a golf ball portion formed from the compositions of the invention may be expressed in terms of absorption, e.g., weight gain or size gain over a period of time at a specific conditions, and transmission, e.g., moisture vapor transmission rate (MVTR) according to ASTM E96-00. MVTR refers to the mass of water vapor that diffused into a material of a given thickness per unit area per unit time at a specific temperature and humidity differential. For example, weight changes of a golf ball portion monitored over a period of seven weeks in 100 percent relative humidity and 72° F. help to demonstrate which balls have better water resistance. In one embodiment, the golf ball portions of the invention have a weight gain of about 0.15 grams or less after seven weeks. In another embodiment, the golf balls of the invention have a weight gain of about 0.13 grams or less after a seven-week storage period. In still another embodiment, the weight gain of the golf balls of the invention is about 0.09 grams or less after seven weeks. In yet another embodiment, the weight gain is about 0.06 grams or less after a seven-week period. The golf balls of the invention preferably have a weight gain of about 0.03 grams or less over a seven-week storage period.

Size gain may also be used as an indicator of water resistance. That is, the more water a golf ball takes on, the larger a golf ball becomes due to the water enclosed beneath the outermost layer of the golf ball portion. Thus, the golf balls of the invention preferably have no appreciable size gain. In one embodiment, the size gain of the golf balls of the invention after a seven-week period is about 0.001 inches or less.

MVTR of a golf ball, or portion thereof, may be about 2 g/($m^2$×day) or less, such as about 0.45 to about 0.95 g/($m^2$×day), about 0.01 to about 0.9 g/($m^2$×day) or less, at 38° C. and 90 percent relative humidity.

Light Stability

The light stability of the cover may be quantified by the difference in yellowness index ($\Delta YI$), i.e., yellowness measured after a predetermined exposure time—yellowness before exposure. In one embodiment, the ΔYI is about 10 or less after 5 days (120 hours) of exposure, preferably about 6 or less after 5 days of exposure, and more preferably about 4 or less after 5 days of exposure. In another embodiment, the ΔYI is about 2 or less after 5 days of exposure, and more preferably about 1 or less after 5 days of exposure. In yet another embodiment, the ΔYI is about 80 or less after 8 days (192 hours) of exposure, preferably about 60 or less after 8 days of exposure, and more preferably about 40 or less after 8 days of exposure. In still another embodiment, the ΔYI is about 30 or less after 8 days (192 hours) of exposure, preferably about 28 or less after 8 days of exposure, and more preferably about 25 or less after 8 days of exposure.

The difference in the b chroma dimension (Δb*, yellow to blue) is also a way to quantify the light stability of the cover. In one embodiment, the Δb* is about 4 or less after 5 days (120 hours) of exposure, preferably about 3 or less after 5 days of exposure, and more preferably about 2 or less after 5 days of exposure. In another embodiment, the Δb* is about 1 or less after 5 days of exposure. In yet another embodiment, the Δb* is about 25 or less after 8 days (192 hours) of exposure, preferably about 20 or less after 8 days of exposure, and more preferably about 15 or less after 8 days of exposure. In still another embodiment, the Δb* is about 14 or less after 8 days (192 hours) of exposure, preferably about 13 or less after 8 days of exposure, and more preferably about 12 or less after 8 days of exposure.

EXAMPLE

The following non-limiting examples are merely illustrative of the preferred embodiments of the present invention, and are not to be construed as limiting the invention, the scope of which is defined by the appended claims. Parts are by weight unless otherwise indicated.

Example 1

Composition of the Invention

A prepolymer, formed using an amine adduct having a silicone backbone according to the present invention, was cured with an amine-terminated curing agent to form a cover composition as shown in Table 4 below. Both the prepolymer and curing agent included in the formulation of the invention are aromatic-aliphatic in nature. A control cover formulation using a conventional aromatic prepolymer and aromatic curing agent was made as shown below. In particular, the prepolymer and curing agent of the control formulation are aromatic, i.e., the components include carbon-carbon double bonds and, in particular, benzene rings. As such, the invention formulation is inherently more light stable than the control formulation. In addition, the shear rating of the invention formulation is higher than the shear rating of the control formulation.

TABLE 4

COMPOSITION ACCORDING TO INVENTION AND RESULTANT GOLF BALL PROPERTIES

|  |  | Invention | Control |
|---|---|---|---|
| Formation | Prepolymer | A1[1] | A2[2] |
|  | Curing Agent | B1[3] | B2[4] |
|  | White Dispersion | C1[5] | C2 |

TABLE 4-continued

COMPOSITION ACCORDING TO INVENTION AND RESULTANT GOLF BALL PROPERTIES

|  | Invention | Control |
|---|---|---|
| Properties |  |  |
| Material Hardness | 43D | 48D |
| Cover Hardness C/D | 58/82 | 63/81 |
| Compression Avg. | 89 | 89 |
| CoR @ 125 ft/sec. | 0.808 | 0.809 |
| Impact Durability, 400 hits | 1 @ 325 | no failures |
| Cold Crack, 5° F., 15 hits | no failures | no failures |
| Shear Rating on Molded Ball | 1 | 0 |
| ΔYI/Δb* After 8 Days of QUV Exposure | 27.9/14.5 | 81.0/28.14 |

[1]A1 is a reaction product of HDI dimer with an amine adduct having a silicone backbone, i.e., an amine adduct of Jeffamine ® D-2000 and silicone.
[2]A2 is a reaction product of MDI/PTMEG 2000 with 6% NCO.
[3]B1 is Ethacure ® 100LC, which is a diethyltoluenediamine from Albemarle.
[4]B2 is Ethacure ® 300, which is a is di-(methylthio)toluenediamine from Albemarle.
[5]C1 is HCC19584, which is a white dispersion from The PolyOne Corporation.

Example 2

Composition of the Invention

An amine adduct of the present invention was used as a curing agent to a prepolymer formed from a HDI dimer to form a cover composition (as shown in Table 5 below). A control cover formulation using a conventional prepolymer and curing agent was made as shown below. In particular, both the prepolymer and curing agent included in the formulation of the invention are aromatic-aliphatic in nature. Comparatively, the prepolymer and curing agent of the control formulation are aromatic, i.e., the components include carbon-carbon double bonds and, in particular, benzene rings. As such, the invention formulation is inherently more light stable than the control formulation.

The properties of the resultant golf ball are provided and compared to a control golf ball prepared according to the formulation set forth. Both the golf ball of the invention and the control golf ball were formed using a polybutadiene rubber core and a thermoplastic inner cover layer. As can be seen in the table, the formulation of the invention produces a cover and resultant golf ball with similar properties as the control formulation.

TABLE 5

COMPOSITION ACCORDING TO INVENTION AND RESULTANT GOLF BALL PROPERTIES

|  |  | Invention | Control |
|---|---|---|---|
| Formation | Prepolymer | A3[1] | A2[2] |
|  | Curing Agent | B3[3] | B2[4] |
|  | White Dispersion | C1[5] | C1 |
| Properties |  |  |  |
| White Dispersion | | C1[5] | C1 |
| Material Hardness | | 45ShoreD | 48ShoreD |
| Compression | | 87 | 87 |

TABLE 5-continued

COMPOSITION ACCORDING TO INVENTION
AND RESULTANT GOLF BALL PROPERTIES

|  | Invention | Control |
|---|---|---|
| CoR @ 125 ft/sec | 0.805 | 0.807 |
| Impact Durability, 400 hits | No failure | No failure |
| Cold Crack, 5° F., 15 hits | No failure | No failure |

[1]A3 is a prepolymer is a reaction product of HDI dimer with an amine-alcohol of Jeffamine D-2000/caprolactone.
[2]A2 is a reaction product of MDI/PTMEG 2000 with 6% free NCO.
[3]B3 is an amine adduct of 1,4-butanediol diglycidal ether with diethyltoluenediamine (Ethacure ® 100LC from Albemarle).
[4]B2 is Ethacure ® 300, which is a di-(methylthio)toluenediamine from Albemarle.
[5]C1 is HCC19584, which is a white dispersion from The PolyOne Corporation.

Example 3

Gel Time

Formulations according to the present invention were compared with a control formulation to determine the effect on gel time/cure rate of the composition. Invention 1 formulation includes an amine adduct of dimethyl siloxane and N,N'-diisopropyl-isophorone diamine and Invention 2 formulation includes an amine adduct of diglycidal ether and N,N'-diisopropyl-isophorone diamine. As shown in Table 6, the formulations of the invention, i.e., those including amine adducts, have a slower rate of cure or gel as compared to control formulations.

TABLE 6

COMPOSITION ACCORDING TO INVENTION
AND RESULTANT EFFECT ON GEL TIME

| Formulation | Invention 1 | Invention 2 | Control |
|---|---|---|---|
| Prepolymer | A4[1] | A4 | A4 |
| Curing Agent | B4[2] | B5[3] | B6[4] |
| White Dispersion | C1[5] | C1 | C1 |
| Gel Time | 60 | 60 | 45 |

[1]A4 is a reaction product of H$_{12}$MDI/Jeffamine ® D-2000 with 7% Desmodur N-3300.
[2]B4 is Jefflink ® 754, which is N,N'-diisopropyl-isophorone diamine from Huntsman Corp.
[3]B5 is an amine adduct of diglycidal ether with Jefflink ® 754.
[4]B6 is an amine adduct of dimethyl siloxane and Jefflink ® 754.
[5]C1 is a HCC19584, which is a white dispersion from The PolyOne Corporation.

Example 4

Thermoplastic Silicone-Urethane Copolymers of the Invention

A conventional solid construction including a cis-1,4 polybutadiene rubber that has been cross-linked with a metal salt of an unsaturated fatty acid such as zinc diacrylate may be used to create a core. The core construction may then be covered using conventional compression molding, or injection molding or casting techniques with a cover formulation containing a thermoplastic silicone-urethane copolymer of the invention by using a one-shot method or pre-polymer approach. For example, the method may include intimately mixing 0.05 mole of methane bis(4-phenylisocynate) (MDI), 0.015 mole of 3-hydroxypropyl terminated polydimethylsiloxane (molecular weight about 1000) and 0.035 mole of 1,4 butanediol and a suitable catalyst and elevated temperatures if needed. The cover may be between about 0.05 and 0.10 inches thick.

In another example of the invention, a copolymer of silicone-polyurethane is blended with at least one thermoplastic or thermoset polymer, including ionomers and their acid polymers including highly neutralized polymers, polyolefins, polyacrylates, polyamides, polyphenylene oxide, polyisoprene, block copoly (ether or ester-amide), block copoly (ether or ester-ester), polysulfones, reaction injection moldable thermoplastic and thermoset polymers, block copolymer of styrene-butadiene and its hydrogenated derivatives, dynamically vulcanized ethylene-propylene rubber, polyvinylidenefluoride, acrylocnitrile-butadiene styrene copolymer, polyureas, epoxy resins, polystyrenes, acrylics, polyethylenes, polyamides, polybutadienes and polyesters.

A golf ball including a core, an inner cover having a flexural modulus greater than 50,000 psi, and a cover comprised of thermoplastic silicone-urethane copolymers may also be formed according to the invention. The cover may be about 0.02 to 0.05 inches thick and, in one embodiment, have initial modulus of less than 10,000 psi. In another embodiment, the initial modulus may be between about 300 psi and 100,000 psi.

A golf ball including a core, cover, and intermediate layer of thermoplastic silicone-urethane copolymer is formed. The core preferably has a diameter of at least 1.0 inch. The intermediate layer is preferably between about 0.02 to 0.10 inches, and the cover has a thickness of less than about 0.1 inches. Preferably, the cover is formed of a thermoset or thermoplastic material such as polyurethane, polyurea, ionomer, or other elastomer. The polybutadiene rubber composition of the core comprises at least 2.2 pph of a halogenated organosulfur compound, preferably zinc pentachlorothiophenol.

Table 7 summarizes the golf ball performance of several experimental ball cover compositions including a copolymer of silicone-polyester urethane or silicone-polycarbonate urethane. For this study, cores having a diameter of about 1.55 inches and compression of about 81 were used and a casing layer having a thickness of about 0.035 inches was molded about the core by compression molding. The Coefficient of Restitution (CoR) of the golf ball was greater than about 0.8. The outer cover layer of the golf ball is about 0.030 inches thick and was molded over the casing layer using a retractable pin injection molding process.

TABLE 7

SILICONE-URETHANE COPOLYMER
AS AN OUTER COVER LAYER

|  | Ex. 1 | Ex. 2 | Ex. 3 | CE1 |
|---|---|---|---|---|
| Cover Compositions |  |  |  |  |
| Aliphatic Silicone-polyester urethane (hard) | 100 |  |  |  |
| Aliphatic Silicone-polyester urethane (soft) |  | 100 |  |  |
| Aliphatic Silicone-polycarbonate urethane (hard) |  |  | 100 |  |
| Light stable polyurethane cover (Shore D 55) |  |  |  | 100 |
| Properties |  |  |  |  |
| Flexural modulus of the cover material (kpsi) | 78.4 | 13.9 | 73.2 |  |
| Ball Compression | 96 | 90 | 95 | 97 |
| CoR at 125 ft/sec | 0.811 | 0.803 | 0.809 | 0.805 |

Table 8 summarizes the effect of silicone-urethane copolymer as an inner cover layer. Cores having a diameter of 1.550 inches, an Atti Compression of about 77, and a COR of about 0.830 were used for this study. The silicone-urethane compositions were molded around the core using an injection molding process.

TABLE 8

Effect of Silicone Urethane Copolymer as an Inner Cover Layer on Ball Properties

|  | Ex. 4 | Ex. 5 | Ex. 6 | CE #2 |
|---|---|---|---|---|
| Inner Cover Compositions |  |  |  |  |
| Aliphatic silicone-polyester urethane (hard) | 100 |  |  |  |
| Aliphatic silicone-polyester urethane (soft) |  | 100 |  |  |
| Aliphatic silicone-polycarbonate urethane (hard) |  |  | 100 |  |
| Surlyn 7940/Surlyn 8940 (50/50) |  |  |  | 100 |
| Properties |  |  |  |  |
| Flexural modulus of inner cover material (kpsi) | 78.4 | 13.9 | 73.2 | 64.0 |
| Compression for the casing construction | 90 | 81 | 91 | 87 |
| CoR at 125 ft/sec for the casing layer | 0.831 | 0.821 | N/A | 0.843 |

Other than in the examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

The invention claimed is:

1. A golf ball comprising a core and a cover, wherein at least a portion of the golf ball is formed from a composition comprising:
   a prepolymer comprising an isocyanate and at least one of an amine-terminated component or a hydroxy-terminated component; and
   a curing agent comprising an adduct formed from the reaction product of an amine and a silicone having at least one end group comprising oxirane functionality.

2. The golf ball of claim 1, wherein the silicone has oxirane functional end groups.

3. The golf ball of claim 1, wherein the composition has a gel time of about 45 seconds or greater.

4. The golf ball of claim 3, wherein the composition has a gel time of about 60 seconds or greater.

5. The golf ball of claim 1, wherein the portion is the cover of the golf ball.

6. The golf ball of claim 5, wherein the cover comprises an inner cover layer and an outer cover layer, and wherein the outer cover layer comprises the composition.

7. The golf ball of claim 6, wherein the inner cover layer comprises thermoplastic or thermoset material.

8. The golf ball of claim 6, wherein the inner cover layer comprises a highly neutralized polymer.

9. A golf ball comprising a core and a cover, wherein the cover is formed from a composition comprising:
   a prepolymer comprising urea or urethane linkages and having terminal ends comprising hydroxy groups or amine groups; and
   a curing agent comprising an adduct comprising a reaction product formed from an amine and a compound comprising a silicone backbone with oxirane functionality.

10. The golf ball of claim 9, wherein the silicone backbone comprises dimethyl siloxane, 1,3-bis(3-aminopropyl)tetramethyl-di-siloxane, 1,4-bis(3-aminopropyldimethylsilyl)benzene, or mixtures thereof and.

11. The golf ball of claim 9, wherein the prepolymer consists of urea linkages.

12. A method of forming a golf ball comprising a core and a cover, comprising the following steps:
   providing a core;
   providing a precursor formed from a silicone with at least one oxirane functional endcap;
   forming an amine adduct by reacting an amine-terminated compound with the precursor, wherein the amine adduct comprises the precursor as the backbone;
   forming a prepolymer comprising:
      an isocyanate-containing component; and
      a hydroxy-terminated component, an amine-terminated component, or a combination thereof;
   reacting the amine adduct with the prepolymer to form a material; and
   forming the cover from the material.

13. The method of claim 12, wherein the step of providing a precursor comprises reacting a silicone compound with an oxirane functional resin.

14. The method of claim 13, wherein the silicone compound is selected from the group consisting of dimethyl siloxane, 1,3-bis(3-aminopropyl)tetramethyl-di-siloxane, 1,4-bis(3-aminopropyldimethylsilyl)benzene, and mixtures thereof.

15. The method of claim 14, wherein the oxirane functional resin is selected from the group consisting of 1,4-butanediol diglycidyl ether, diglycidyl ether of bisphenol A, cresyl diglycidyl ether, ethylhexyl glycidyl ether, and mixtures thereof.

16. The method of claim 12, further comprising the step of forming a layer disposed about the core, and wherein the step of forming the cover from the material further comprises forming the cover about the layer.

17. The method of claim 16, wherein the step of forming the layer comprises providing a thermoplastic material and forming the layer from the thermoplastic material.

18. The method of claim 17, wherein the thermoplastic material comprises a highly neutralized polymer.

* * * * *